United States Patent
Taniguchi et al.

(10) Patent No.: US 10,721,033 B2
(45) Date of Patent: Jul. 21, 2020

(54) WIRELESS COMMUNICATION APPARATUS AND WIRELESS COMMUNICATION METHOD

(71) Applicant: KABUSHIKI KAISHA TOSHIBA, Minato-ku, Tokyo (JP)

(72) Inventors: Kentaro Taniguchi, Kanagawa (JP); Toshihisa Nabetani, Kanagawa (JP); Ryota Sekiya, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 2 days.

(21) Appl. No.: 15/902,243

(22) Filed: Feb. 22, 2018

(65) Prior Publication Data

US 2019/0068324 A1 Feb. 28, 2019

(30) Foreign Application Priority Data

Aug. 23, 2017 (JP) ................... 2017-160431

(51) Int. Cl.
*H04L 1/18* (2006.01)
*H04L 1/00* (2006.01)
*H04L 29/06* (2006.01)

(52) U.S. Cl.
CPC .......... *H04L 1/1893* (2013.01); *H04L 1/0041* (2013.01); *H04L 1/0045* (2013.01);
(Continued)

(58) Field of Classification Search
CPC combination set(s) only.
See application file for complete search history.

(56) References Cited

U.S. PATENT DOCUMENTS 5,189,411 A * 2/1993 Collar .................... G04G 21/04
340/7.2
6,484,287 B1 * 11/2002 Hagele .................. H04B 7/022
714/807
(Continued)

FOREIGN PATENT DOCUMENTS

JP 2019-022053 A 2/2019
WO WO-2009/060628 A1 5/2009

OTHER PUBLICATIONS

IEEE Standards Association/IEEE Computer Society: "Part 11: Wireless LAN Medium Access Control (MAC) and Physical Layer (PHY) Specifications; Amendment 4: Enhancements for Very High Throughput for Operation in Bands Below 6 GHz", IEEE Std 802.11ac™, The Institute of Electrical and Electronics Engineers, Inc., Dec. 2013, pp. 1-425.

*Primary Examiner* — Joseph D Torres
(74) *Attorney, Agent, or Firm* — Foley & Lardner LLP

(57) ABSTRACT

According to one embodiment, a wireless communication apparatus includes controlling circuitry and transmitter circuitry. The controlling circuitry is configured to divide data into bit strings by a unit of a first number of bits; add at least one padding bit to one of the bit strings according to a difference between a number of bits of the one of the bit strings and the first number of bits, when the one of the bit strings has a number of bits less than the first number of bits; add error correction codes to the bit strings to generate encoded blocks, wherein each of the error correction codes has a second number of bits; combine the encoded blocks to generate encoded frames; and aggregate the encoded frames to generate a transmission packet. The transmitter circuitry is configured to transmit the transmission packet.

11 Claims, 13 Drawing Sheets

(52) U.S. Cl.
CPC .......... *H04L 1/0058* (2013.01); *H04L 1/1812* (2013.01); *H04L 1/1845* (2013.01); *H04L 1/1861* (2013.01); *H04L 1/0083* (2013.01); *H04L 1/188* (2013.01); *H04L 69/22* (2013.01)

(56) References Cited

U.S. PATENT DOCUMENTS

| | | | |
|---|---|---|---|
| 6,738,369 B1 * | 5/2004 | Hippelainen | H04L 29/06 370/347 |
| 6,771,660 B1 * | 8/2004 | Bourlas | H04L 29/06 370/350 |
| 8,418,036 B2 * | 4/2013 | Yuan | H04L 1/0057 370/392 |
| 2002/0078418 A1 * | 6/2002 | Kikuchi | G11B 27/3027 714/789 |
| 2005/0063405 A1 * | 3/2005 | Borsum | H04L 12/40071 370/419 |
| 2007/0076680 A1 * | 4/2007 | Amram | H04L 1/0083 370/349 |
| 2007/0101228 A1 * | 5/2007 | Vesma | H04L 1/0041 714/752 |
| 2007/0101229 A1 * | 5/2007 | Niu | H03M 13/1102 714/752 |
| 2007/0143655 A1 * | 6/2007 | Niu | H03M 13/1102 714/752 |
| 2007/0143656 A1 * | 6/2007 | Niu | H03M 13/1102 714/752 |
| 2007/0263584 A1 * | 11/2007 | Kim | H04L 1/007 370/342 |
| 2010/0100795 A1 * | 4/2010 | Yuan | H04L 1/0041 714/776 |
| 2010/0142915 A1 * | 6/2010 | McDermott | G11B 27/034 386/343 |
| 2011/0066912 A1 * | 3/2011 | Riess | H04L 1/1812 714/751 |
| 2011/0093762 A1 * | 4/2011 | Kwon | H03M 13/09 714/758 |

* cited by examiner

US 10,721,033 B2

WIRELESS COMMUNICATION APPARATUS AND WIRELESS COMMUNICATION METHOD

CROSS REFERENCE TO RELATED APPLICATIONS

This application is based upon and claims the benefit of priority from Japanese Patent Application No. 2017-160431, filed on Aug. 23, 2017, the entire contents of which are incorporated herein by reference.

FIELD

Embodiments described herein relate to a wireless communication apparatus and a wireless communication method.

BACKGROUND

Hybrid automatic repeat request (HARQ) is known as technology for improving band utilization efficiency of wireless communication. HARQ is one of error control technologies used in the wireless communication and uses a combination of automatic repeat request (ARQ) and forward error correction (FEC). To realize HARQ, a method using block encoded data is also developed.

In HARQ, frames of a plurality of encoded data can be aggregated and transmitted. However, when the encoded data is frame aggregated (frame aggregation), boundaries after encoding may not be matched with boundaries of the frames. In this case, boundaries of information bits in each code word are not necessarily matched in a first transmission frame and a retransmission frame and bit sequences may be different in the first transmission frame and the retransmission frame in which parities of the code words are different. As a result, it becomes difficult to synthesize parity portions and it is impossible to fully demonstrate the error correction function in HARQ.

DETAILED DESCRIPTION

According to one embodiment, a wireless communication apparatus includes controlling circuitry and transmitter circuitry. The controlling circuitry is configured to divide data into bit strings by a unit of a first number of bits; add at least one padding bit to one of the bit strings according to a difference between a number of bits of the one of the bit strings and the first number of bits, when the one of the bit strings has a number of bits less than the first number of bits; add error correction codes to the bit strings to generate encoded blocks, wherein each of the error correction codes has a second number of bits; combine the encoded blocks to generate encoded frames; and aggregate the encoded frames to generate a transmission packet. The transmitter circuitry is configured to transmit the transmission packet.

Hereinafter, embodiments of the present invention will be described with reference to the drawings. All of the embodiments described below relate to a wireless communication device that improves efficiency of HARQ.

HARQ is used as a method of improving band utilization efficiency in wireless packet communication. This HARQ is used in wireless communication such as high speed downlink packet access (HSDPA) and long term evolution (LTE), for example. In HARQ, when an error occurs at the receiver side, a retransmission packet is transmitted from the transmitter side and a signal quality is improved by synthesizing reliability information at the receiver side. As reliability technology, there is a method of improving the signal quality by synthesizing a log likelihood ratio (LLR). In HARQ, two methods are mainly used.

A first method is a chase combining (CC) method. In the CC method, a transmitter transmits the same data in a first transmission packet and a retransmission packet and likelihood synthesis is performed in a receiver. By this likelihood synthesis, an influence of noise can be alleviated and a quality of a received signal can be improved.

A second method is an incremental redundancy (IR) method. In the IR method, the transmitter transmits partially or entirely different data in the first transmission packet and the retransmission packet. When a redundant encoded signal is transmitted in the first transmission packet and error correction cannot be performed in the receiver, the transmitter transmits an additional redundant signal in the retransmission packet. In the receiver, the likelihood of the first transmission packet and the likelihood of the retransmission packet are synthesized, so that it is possible to improve the error correction capability and improve the reception performance. This embodiment can be applied to any one of the two methods of the CC method and the IR method.

Figure 1:
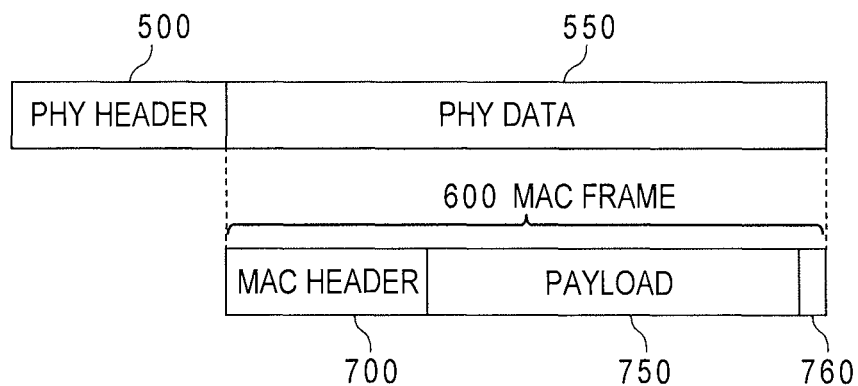
FIG. 1 is a diagram showing an example of packet data.

FIG. 1 is a diagram showing a configuration of a packet generally used as a wireless communication packet. The packet includes a PHY header 500 located at a head and PHY data 550 located subsequently. The PHY data 550 includes a MAC header 700 and a payload 750. The PHY data 550 may further include an error detection bit (sequence) 760 referred to as a frame check sequence (FCS).

Information necessary for signal processing of a physical layer is stored in the PHY header 500. Information necessary for signal processing of a media access control layer (MAC layer) is stored in the MAC header 700. In the receiver, decoding processing of the payload 750 is executed after the information stored in the headers is read.

A combination of the MAC header 700 and the payload 750 is referred to as a MAC frame 600. In FIG. 1, packet data including one MAC frame 600 is shown.

Figure 2:
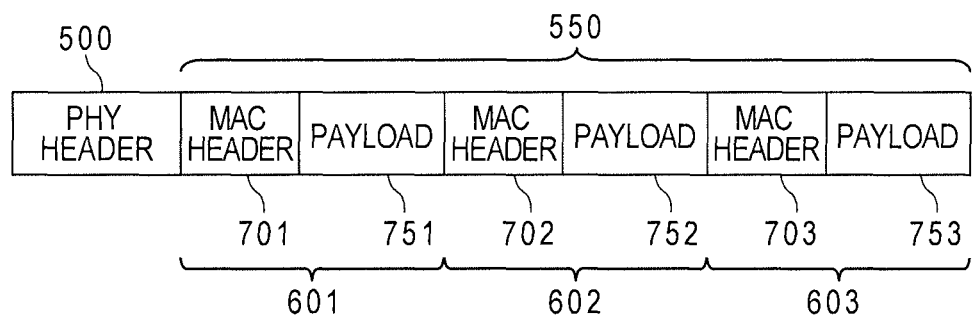
FIG. 2 is a diagram showing an example of packet data.

FIG. 2 is a diagram showing packet data including a plurality of MAC frames. The packet data may include a plurality of MAC frames. For example, a first MAC frame 601, a second MAC frame 602, and a third MAC frame 603 may be included in the PHY data 550. The PHY data 550 is not limited thereto and may include more MAC frames. As such, the plurality of MAC frames is included, so that it is possible to transmit a large amount of information in transmission per packet data. Hereinafter, the MAC frame may be simply referred to as a frame.

In the wireless packet communication, one packet may be configured to include a plurality of frames. Bundling the plurality of frames is referred to as frame aggregation. A wireless communication device of the reception side executes decoding processing for each frame and determines whether or not reception has succeeded. As such, the frames are aggregated, so that high-speed and large-capacity wireless communication can be achieved.

First Embodiment

Figure 3:
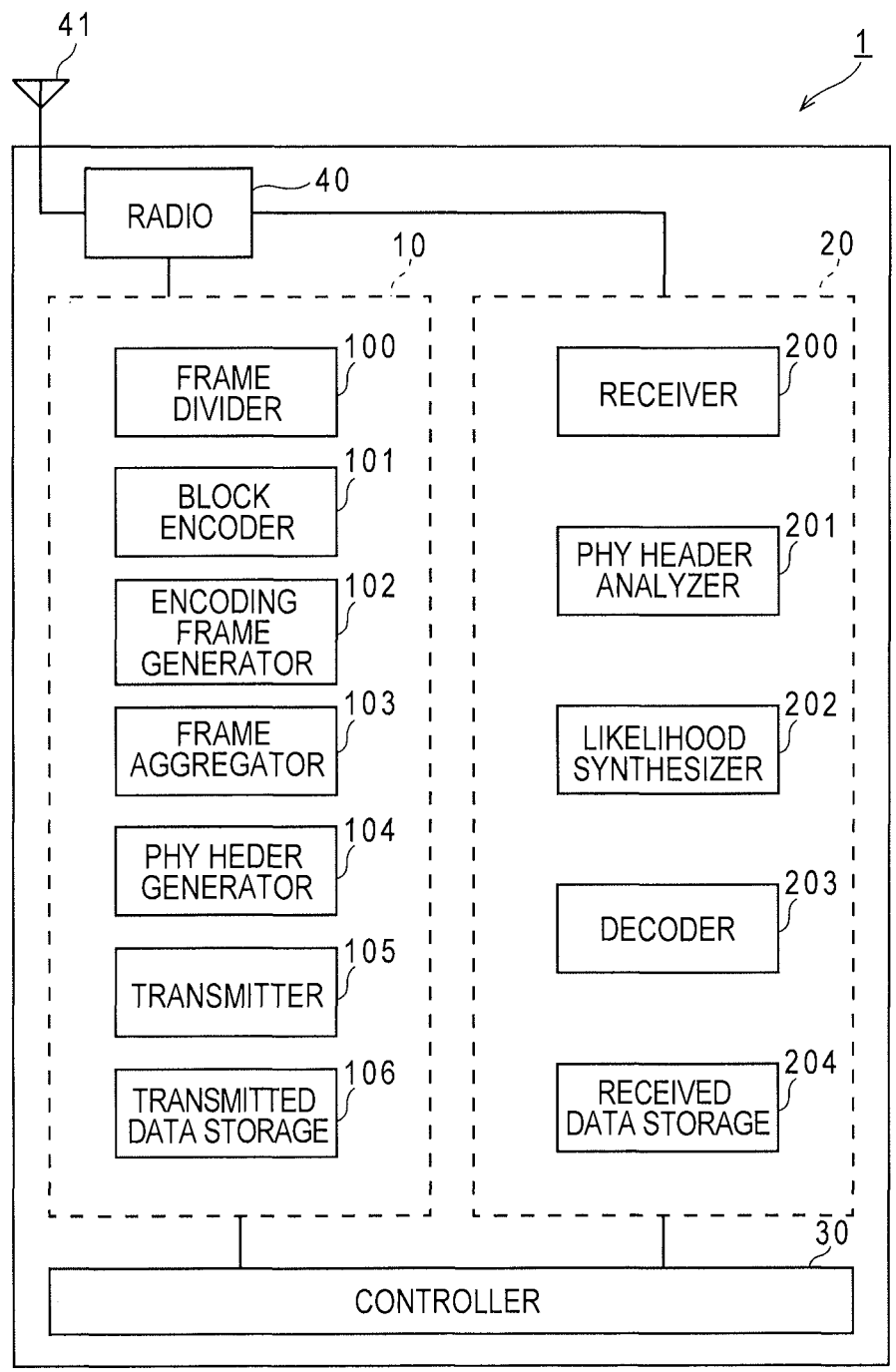
FIG. 3 is a block diagram showing a function of a wireless communication device according to an embodiment.

FIG. 3 is a block diagram showing a function of a wireless communication device 1 according to this embodiment. The wireless communication device 1 includes a transmission block 10, a reception block 20, a controller 30, and a radio 40.

The transmission block 10 includes a frame divider 100, a block encoder 101, an encoding frame generator 102, a frame aggregator 103, a PHY header generator 104, a transmitter 105, and a transmitted data storage 106 and encodes a message to be transmitted and transmits generated transmission packet data.

Each processing in each block may be executed by software (a program) operated by a processor such as a CPU, may be executed by hardware, or may be executed by both the software and the hardware. In addition, each processing in each block may be executed by analog processing, may be executed by digital processing, or may be executed by both the analog processing and the digital processing.

The frame divider 100 divides frames of a message to be transmitted into information bit strings each having a first predetermined number of bits and generates blocks. For example, a block is generated for each first predetermined number in order in which the information bit strings of the message are arranged. A final block may have the number of bits less than the first predetermined number of information bits. However, in this case, padding bits are added to the information bit string, so that the final block becomes a block having the first predetermined number of bits. The padding bits may be obtained by arranging one-bit constants such as 0 and 1 or may be obtained by arranging 2-bit constants such as 10 and when clear distinguishing is enabled, padding may be performed by other method.

The block encoder 101 performs encoding of each block divided by the frame divider 100. The block encoder 101 generates an error correction code of a second predetermined number of bits with respect to the information bit string of the first predetermined number of bits of each block. In addition, the error correction code generated from the information bit string is added to the information bit string to generate an encoded block (hereinafter, referred to as an encoding block) having the first predetermined number+second predetermined number of bits, so that the block is encoded.

As an encoding method, any method in which decoding can be appropriately performed may be used. For example, encoding such as a hamming code, a BCH code, a turbo code, a low density parity check (LDPC) code, and a connection code of these codes can be used. In addition, data may be scrambled at timing before or after encoding.

Figure 4:
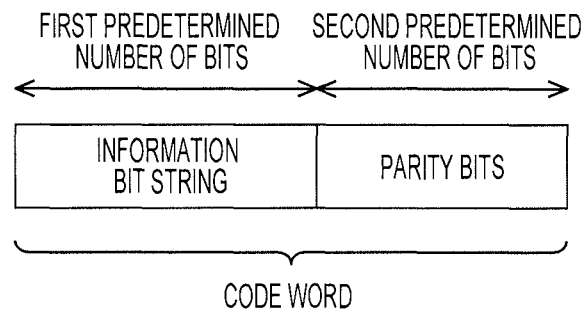
FIG. 4 is a diagram showing an example of data encoding.

FIG. 4 is a diagram showing an example of encoding of the information bit string. First, the block encoder 101 generates parity bits (an error correction bit string) to be the second predetermined number of bits to be redundant bits acquired by the encoding method described above, from information bit string (bit string including padding when the number of bits of the information bit string is less than the first predetermined number of bits) to be the first predetermined number of bits. By bundling the information bit string and the parity bits, one code word is generated. Here, an encoding rate R is defined as the number of bits of the information bit string/the number of bits of the code word, that is, the encoding rate R=(the first predetermined number)/(the first predetermined number+the second predetermined number).

In the above description, padding is added when the frames are divided into the blocks. However, the present invention is not limited thereto. That is, the frame divider 100 may merely divide the frames every first predetermined number of bits and the block encoder 101 may perform padding on the information bit string having the number of bits less than the first predetermined number of bits and perform encoding.

The encoding frame generator 102 generates an encoded frame (hereinafter, referred to as an encoding frame) by connecting encoding blocks. Because the encoding frame is obtained by connecting the encoding blocks each having the first predetermined number of bits+the second predetermined number of bits, the number of bits becomes the integer multiple of the first predetermined number+the second predetermined number.

The frame aggregator 103 aggregates the encoding frames generated by the frame divider 100, the block encoder 101, and the encoding frame generator 102 and generates one PHY data, with respect to a plurality of frames included in a transmission message.

The PHY header generator 104 generates a PHY header regarding the generated PHY data. This PHY header is the same as a PHY header used in general HARQ and it is not necessary to incorporate a special bit string exclusively to this embodiment in particular. Further, the PHY header generator 104 adds the generated PHY header to the PHY data, thereby generating encoded and frame aggregated transmission packet data to be a bit string to be transmitted.

The transmitter 105 transmits the generated transmission packet data to the outside via the radio 40. A wireless communication device 1 of the reception side transmits an acknowledgement (ACK) signal or a negative-acknowledgement (NACK) signal showing whether reception of the packet data transmitted from the outside has succeeded or failed.

The transmitted data storage 106 stores all or a part of the information to be transmitted by the transmitter 105. The information to be stored may be information of the message before encoding or may be information of the transmission packet data after encoding. The stored information is used to generate transmission packet data to be retransmitted, when a retransmission request is transmitted from the wireless communication device 1 of the reception side.

The reception block 20 includes a receiver 200, a PHY header analyzer 201, a likelihood synthesizer 202, a decoder 203, and a received data storage 204 and receives transmission packet data transmitted from the outside and decodes the transmission packet data into the message.

The receiver 200 receives the packet data transmitted from outside via the radio 40.

The PHY header analyzer 201 analyzes the PHY header of the packet data received by the receiver 200 and acquires information necessary for reception, information necessary for decoding the message, and information regarding other packet data.

When the received packet data is the retransmitted packet data, the likelihood synthesizer 202 performs likelihood synthesis and determines whether or not the reception of the packet has succeeded. As such, in the HARQ method, reliability of communication is improved.

The decoder 203 decodes the data encoded in the wireless communication device 1 of the transmission side. The decoder 203 performs decoding of the received packet data using the same method as the encoding. The decoding may be performed for each encoding block. That is, the decoder 203 divides the PHY data of the received packet data into blocks each having the first predetermined number+second predetermined number of bits and performs decoding for each of the divided blocks. In addition, the decoded blocks are connected to acquire the message to be transmitted by the wireless communication device 1 of the transmission side.

When the information bit string or the encoding block is scrambled, descrambling processing may be executed in the decoder 203. Timing of the descrambling corresponds to the timing of the scrambling in the encoding. When the scrambling is performed before the block is encoded, the descrambling is performed after the encoding block is decoded and when the scrambling is performed after the block is encoded, the decoding is performed after the encoding block is descrambled.

The received data storage 204 stores the packet data received by the receiver 200. The stored packet data is used to perform the likelihood synthesis on the packet data retransmitted from the wireless communication device 1 of the transmission side, when the reception has failed and the retransmission request has been made.

The controller 30 controls the above processing of the wireless communication device 1 and executes other necessary processing. Other necessary processing is, for example, processing for outputting the received packet data to a necessary calculator. For example, processing of TCP/IP or UDP/IP may be performed by an upper layer. Processing of the upper layer may be performed by software (a program) by a processor such as a central processing unit (CPU) or may be performed by hardware. As such, the controller 30 may include the CPU or may be designed with a simpler circuit.

In addition, the controller 30 mainly performs all or a part of the processing of the MAC layer and the processing of the physical layer. The controller 30 may include an UL-MU processor to perform processing regarding UL-MU or a CRC checker to perform CRC checking of frames or packets.

In FIG. 3, although the generation of the packet data and the storage of the transmitted packet data are performed by the transmission block 10, these may be performed in the controller 30. That is, the frame divider 100, the block encoder 101, the encoding frame generator 102, the frame aggregator 103, the PHY header generator 104, and the transmitted data storage 106 may be included in the controller 30. Likewise, the PHY header analyzer 201, the likelihood synthesizer 202, the decoder 203, and the received data storage 204 included in the reception block 20 may be included in the controller 30. In addition, the controller 30 may be a control circuit configured using an analog or digital circuit and these functions may be included in the control circuit.

The radio 40 converts the packet data from the transmitter 105 into a radio wave, transmits the radio wave, converts packet data externally received as a radio wave into a signal, and outputs the signal to the receiver 200. The radio 40 may include an antenna 41 for transmitting and receiving the radio wave. The antenna 41 may be a chip antenna, may be an antenna formed by using a wiring line on a printed circuit board, or may be an antenna formed by using a linear conductor element.

Figure 5:
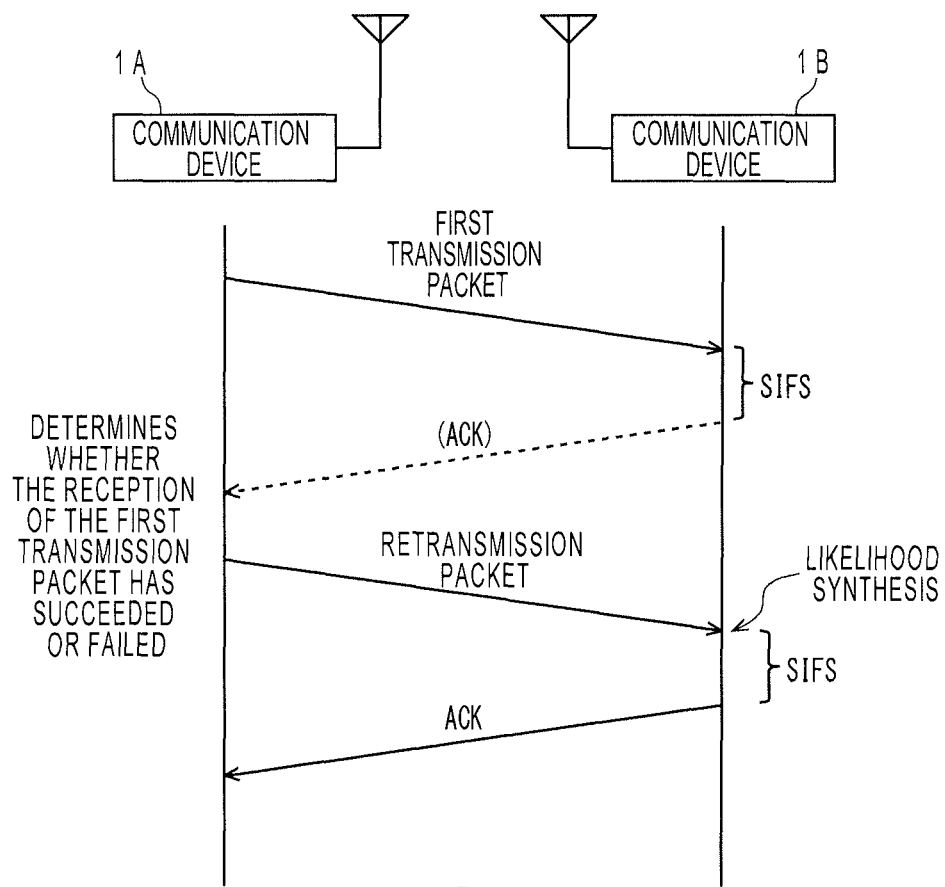
FIG. 5 is a diagram showing an example of wireless communication.

FIG. 5 is a diagram showing an outline of wireless communication using HARQ between a wireless communication device 1A of the transmission side and a wireless communication device 1B of the reception side. A straight line under each of the wireless communication devices 1A and 1B shows a flow of a time and shows that the time passes from the upper side to the lower side of the drawing. Hereinafter, the wireless communication device 1 of the transmission side and elements thereof are denoted by a reference letter A and the wireless communication device 1 of the reception side and elements thereof are denoted by a reference letter B, unless otherwise specified.

First, the wireless communication device 1A transmits packet data, which is the first transmission packet, from the transmitter 105A to the wireless communication device 1B. The transmission of the packet is not limited to being transmitted from the wireless communication device 1A to the wireless communication device 1B with directivity and the wireless communication device 1A may transmit the packet data by broadcasting.

The wireless communication device 113 receives the first transmission packet in the receiver 200B and performs the decoding processing of the first transmission packet. A determination result on whether or not the packet is the first transmission packet is read from data recorded in the PHY header 500, for example.

When there is no decoding error in the decoding processing, the wireless communication device 113 transmits the ACK packet to the wireless communication device 1A via the transmitter 105B. When there is a decoding error, the ACK packet is not returned or the NACK packet not shown in the drawing is transmitted. Similar to the transmission of the packet of the wireless communication device 1A, the wireless communication device 113 may transmit the ACK/NACK packet with directivity and may transmit the ACK/NACK packet by broadcasting. As described above, when the ACK/NACK packet is transmitted, the wireless communication device 113 transmits the ACK/NACK packet within a short inter frame space (SIFS) time. The SIFS time is defined as a different time interval according to the standard and is defined as 16 usec in IEEE802.11ac, for example.

In addition, when the decoding error occurs, the wireless communication device 1B stores the likelihood of the payload 750 in the received data storage 204, in addition to the above correspondence. As another example, the data of the payload 750 may be stored in the received data storage 204.

The wireless communication device 1A determines whether the reception of the first transmission packet has succeeded or failed in the wireless communication device 1B, on the basis of a reception state of the ACK/NACK packet from the wireless communication device 1B received by the receiver 200A. When it is determined that the reception of the first transmission packet has succeeded in the wireless communication device 1B, the wireless communication device 1A ends the processing regarding the transmitted first transmission packet and proceeds to processing such as transmission and reception of a next packet.

On the other hand, when it is determined that the reception of the first transmission packet has failed in the wireless communication device 1B, the wireless communication device 1A transmits the retransmission packet. This retransmission packet is transmitted with data showing the retransmission packet and a redundant packet for the retransmission packet in the transmitter 105A of the wireless communication device 1A. The wireless communication device 1A may include a generator for generating the packet data in each of the first transmission packet and the retransmission packet as a separate generator.

After receiving the retransmission packet, the wireless communication device 1B decodes the PHY header 500 or the MAC header 700 included in the retransmission packet and determines whether the received packet is the first transmission packet or the retransmission packet.

When it is determined that the received packet is the retransmission packet, the wireless communication device 1B executes the decoding processing in the decoder 203B after performing the likelihood synthesis in the likelihood synthesizer 202B. The likelihood synthesis is performed on the basis of the information of the frame received in the past and requested for retransmission, which is stored in the received data storage 204, and the retransmission frame. If it is determined that the quality of the received signal has been improved by the likelihood synthesis in the likelihood synthesizer 202B and the decoding error in the retransmission packet has been eliminated, after the SIFS time has passed from the end of the reception of the retransmission packet, the ACK packet is transmitted from the transmitter 105B.

If the ACK signal is received within the predetermined time, the wireless communication device 1A determines that the reception has succeeded in the wireless communication device 1B and ends the transmission processing of the data included in the packet. On the other hand, when the ACK signal is not received or the NACK signal is received, the wireless communication device 1A determines that the reception has failed in the wireless communication device 1B and executes the retransmission processing of the data included in the packet again.

As such, the wireless communication between the wireless communication device 1A and the wireless communication device 1B is repeated until the packet data is normally transmitted and received. However, the present invention is not limited to the case where the wireless communication is repeated until the packet data is normally transmitted and received. In the case where the transmission and reception fail after the wireless communication is repeated the predetermined number of times, the transmission/reception processing of the packet data is stopped or canceled to secure a band of other communication.

A part or all of the places where the processing of the frame divider 100, the block encoder 101, the frame aggregator 103, the PHY header generator 104, the PHY header analyzer 201, the likelihood synthesizer 202, and the decoder 203 described above is executed may be configured by a circuit and the wireless communication device 1 may include a processing circuit that collectively processes the functions of these individual elements.

When the packet data including the plurality of MAC frames shown in FIG. 2 is encoded with the number of bits shown in FIG. 4 and is transmitted, the entire PHY data is set as one data, blocking and encoding are performed, and the data is transmitted. Because the number of bits of each MAC frame and the number of encoding information bits are independent from each other, the boundaries of the individual MAC frames and the boundaries of the code words are generally not matched with each other. In this embodiment, when the individual MAC frames in the PHY data to be transmitted are blocked, padding bits are appropriately added to match the boundaries of the MAC frames with the boundaries of the code words and precision of the likelihood synthesis is improved.

Figure 6:
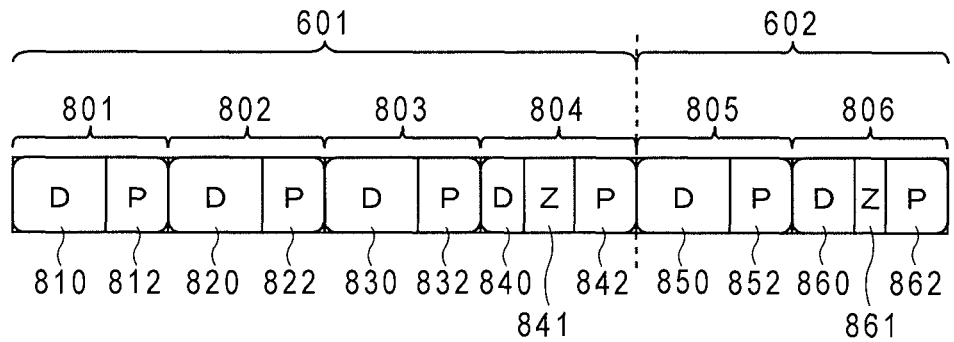
FIG. 6 is a diagram showing a frame aggregated bit string according to an embodiment.

FIG. 6 is a diagram showing an example of the PHY data 550 in the packet data, that is, data including a plurality of MAC frames. In FIG. 6, the PHY data 550 including two MAC frames is shown as the example. In the following drawings, D denotes a bit string of information bits, P denotes a bit string of parity bits, and Z denotes a bit string of padding bits.

In the example of FIG. 6, the PHY data 550 includes encoded MAC frames 601 and 602. The MAC frame 601 includes code words 801, 802, 803, and 804 and the MAC frame 602 includes code words 805 and 806. Each code word includes an information bit string and a parity bit string. For example, the code word 801 includes an information bit string 810 and a parity bit string 812. In addition, padding bit strings are provided as necessary. For example, the code word 804 includes an information bit string 840, a padding bit string 841, and a parity bit string 842.

The information bit string is obtained by blocking the bit string of the MAC frame before encoding every first predetermined number of bits. That is, each of the information bit strings 810, 820, 830, and 850 is a bit string having the first predetermined number of bits. In the case where the number of bits of the bit string of the MAC frame before encoding is not matched with the integer multiple of the first predetermined number, if the frame is divided into blocks each having the first predetermined number of bits, excessive information bit strings are generated. For example, the information bit strings 840 and 860 become bit strings having the number of bits less than the first predetermined number.

In this case, the padding bit strings 841 and 861 are added to the information bit strings 840 and 860, respectively. The padding bit string 841 is a bit string having the number of bits of a value obtained by subtracting the number of bits of the information bit string 840 from the first predetermined number and the padding bit string 861 is a bit string having the number of bits of a value obtained by subtracting the number of bits of the information bit string 860 from the first predetermined number. The padding bit string is, for example, a bit string in which all bits have a value of 0 or a bit string in which all bits have a value of 1. The present invention is not limited thereto and the padding bit string may be a predetermined random bit string. As such, the padding bit string is added to the information bit string having the number of bits less than the first predetermined number of bits, so that the information bit string is converted into the block to be the bit string of the first predetermined number of bits. In FIG. 6, the padding bit string 841 is located between the information bit string 840 and the parity bit string 842. However, the present invention is not limited thereto. The padding bit string 841 may be placed before the information bit string 840 or may be placed after the parity bit string 842.

After dividing the MAC frame, encoding is performed on each divided block to generate a code word. For example, a predetermined operation is executed on the information bit string 810, so that the parity bit string 812 having the second predetermined number of bits is generated. In addition, the information bit string 810 and the parity bit string 812 are combined, so that an encoding block having the first predetermined number+second predetermined number of bits is generated. A method of generating the parity bit string is executed using any method as described above. For the information bit string 840, the padding bit string 841 is added to become the first predetermined number of bits. After that, an encoding block is generated by executing a predetermined operation, that is, the generation of the parity bit string 842 having the second predetermined number of bits and combining the parity bit string 842 and the information bit string 840.

As such, when the data to be transmitted is divided into blocks, the padding bit strings are added as necessary, so that it is possible to match the boundaries of the MAC frames after encoding with the boundaries of the code words, that is, the encoding blocks. In the example of FIG. 6, an end of the code word 804 is matched with an end of the encoded MAC frame 601 and similarly, an end of the code word 806 is matched with an end of the encoded MAC frame 602. Such block division and encoding are applied to both the first transmission packet and the retransmission packet. That is, in the packets to be transmitted in this embodiment, both the first transmission packet and the retransmission packet have a mode in which the boundaries of the MAC frames are matched with the boundaries of the code words.

Figure 7:
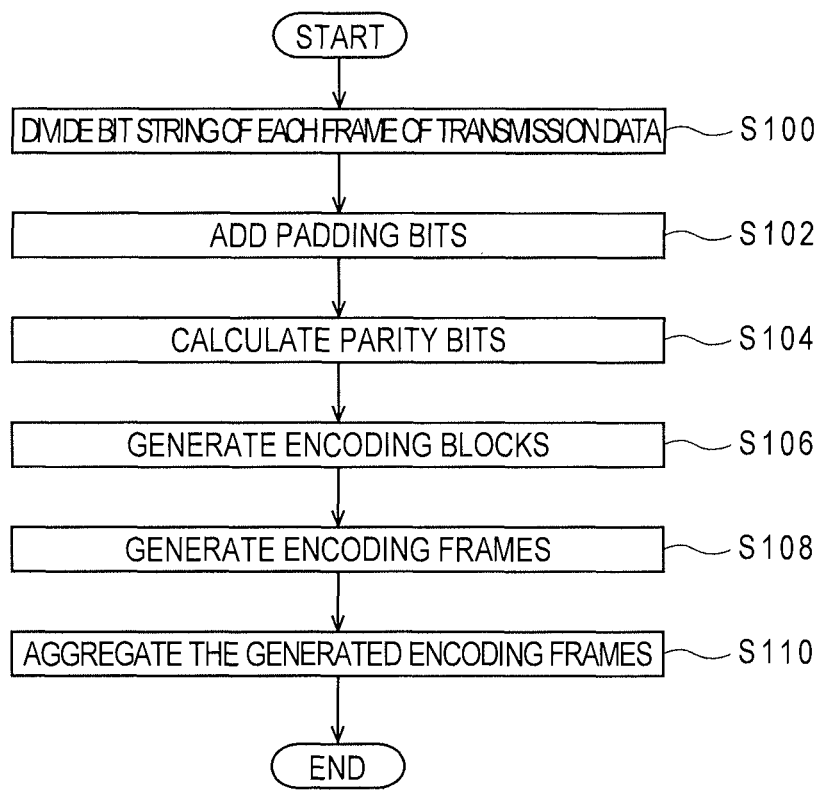
FIG. 7 is a flowchart illustrating processing of frame aggregation according to an embodiment.
Figure 8:
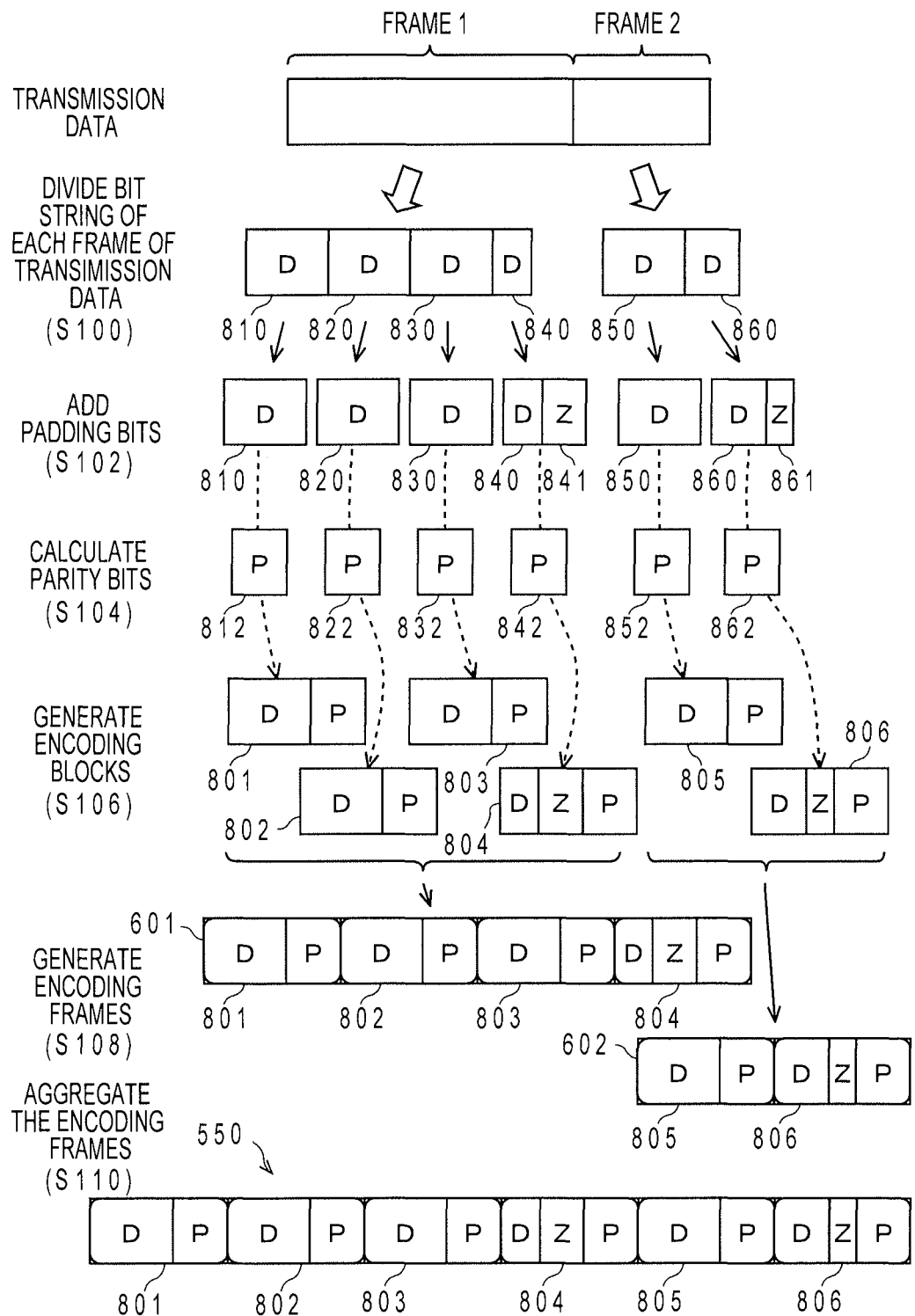
FIG. 8 is a diagram showing an example of a frame aggregated bit string according to an embodiment.

FIG. 7 is a flowchart illustrating encoding processing of transmission data according to this embodiment, particularly, the PHY data 550. FIG. 8 is a diagram showing division and coupling of data in each processing. By referring to these drawings, processing up to the frame aggregation according to this embodiment will be described.

First, the frame divider 100 of the wireless communication device 1 divides bit strings of frames of data to be transmitted every first predetermined number of bits (S100).

Next, when there is a block having the number of bits less than the first predetermined number of bits, the frame divider 100 adds padding bits to the block to become a bit string having the first predetermined number of bits (S102). The block having the number of bits less than the first predetermined number of bits is, for example, a final block when the frame is divided into the blocks from a head of the frame.

Next, the block encoder 101 calculates parity bits to be redundant bits for error correction for each information block consisting of the divided bit strings having the first predetermined number of bits (S104).

Next, the block encoder 101 combines the bit strings of the blocks and the calculated parity bits and generates encoding blocks (S106). The processing from S100 to S106 may be repeated for each block or may be executed in parallel, in a part or all of the blocks.

Next, the encoding frame generator 102 combines the generated encoding blocks for each of the frames and generates encoding frames (S108).

Next, the frame aggregator 103 aggregates the generated encoding frames and generates the PHY data 550 (S110).

By executing the above processing, the end of the frame is matched with the end of the code word (encoding block) in the bit strings of each frame stored in the PHY data 550.

Figure 9:
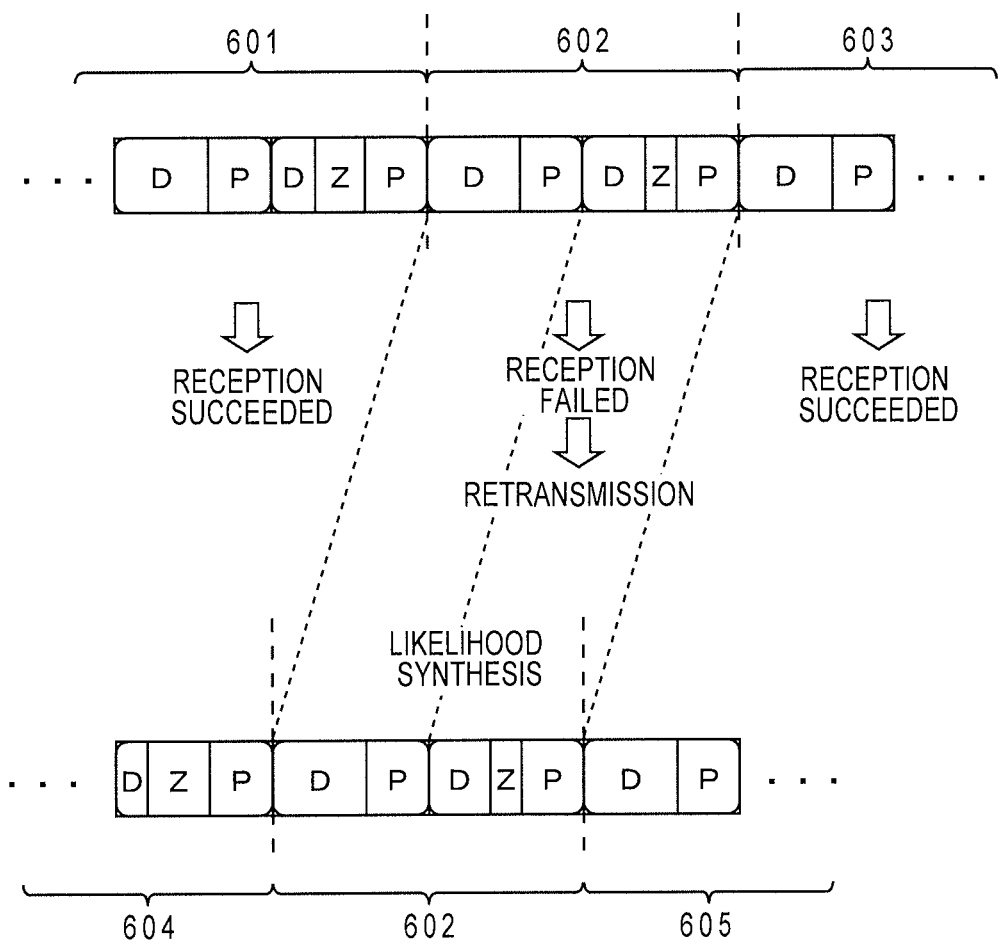
FIG. 9 is a diagram showing an example of likelihood synthesis according to an embodiment.

FIG. 9 is a diagram showing an example of the likelihood synthesis according to this embodiment. FIG. 9 shows an example of the case where reception of the MAC frames 601 and 603 has succeeded and reception of the MAC frame 602 has failed. As such, when the reception of the MAC frame 602 has failed, for example, frames are aggregated in order of MAC frames 604, 602, and 605 as a retransmission packet.

Even when a total size of the MAC frame existing before the MAC frame 602 is different, a start address of the MAC frame 602 and a start address of a code word existing at the head of the MAC frame 602 are matched in both the first transmission frame and the retransmission frame. Therefore, the likelihood synthesis can be performed with the parity bit string included without decoding the information bit string of the frame.

In the case where the padding bit is not inserted, according to the example of FIG. 9, while in the first transmission packet, the information bit string of the final block of the MAC frame 601 and the information bit string of the first block of the MAC frame 602 are included in the same code word, in the retransmission packet, the information bit string of the final block of the MAC frame 604 and the information bit string of the first block of the MAC frame 602 are included in the same code word. For this reason, the bit strings become different bit strings. In addition, because the boundaries of the bit strings of the MAC frame 602 are different in the first transmission packet and the retransmission packet, it is difficult to perform the likelihood synthesis before decoding the MAC frame 602 and the parity bit string becomes a different bit string originally. As a result, the likelihood synthesis cannot be performed. The same is applicable to the end of the MAC frame 602.

As described above, according to this embodiment, the padding bits are appropriately added to the MAC frame, so that the boundaries of the MAC frames in the PHY data 550 and the boundaries of the code words after encoding each MAC frame can be matched with each other. That is, it is possible to match the boundaries of the MAC frames transmitted in the first transmission packet with the boundaries of the same MAC frames transmitted in the retransmission packet.

Therefore, according to this embodiment, the received data before decoding in which it is difficult to perform the likelihood synthesis by the direct comparison in the related art can be likelihood synthesized without decoding and the likelihood synthesis can be efficiently performed. In addition, because the likelihood synthesis can be performed on the parity bits, an effect of improving reception sensitivity of the signal can be further raised. Particularly, in HARQ of the CC method, because the likelihood synthesis is performed on the frame of the first transmission packet of which the reception has failed and the frame of the retransmission packet on the assumption that the same data is transmitted, an effect according to this embodiment is high.

Second Embodiment

In the embodiment described above, an example of generating transmission packet data in HARQ of a CC method has been mainly described. However, reception sensitivity of a signal is improved by inserting padding in an IR method as well as the CC method. Hereinafter, the case of the IR method will be described.

In the case of the IR method, in a retransmission frame, a part or all of parity bits among redundant encoded bit strings are retransmitted. In this case, for example, in the case of encoding in the retransmission frame, encoding of the same method as a first transmission frame is performed and encoding in which an encoding rate is lower than an encoding rate of the first transmission frame, that is, the number of error correction bits is increased is used.

The encoding according to this embodiment will be described using the flowchart of FIG. 7. For encoding of the first transmission packet or the first transmission frame, the same processing as the processing in the first embodiment is executed. For the retransmission frame, the processing from S100 to S104 is the same as the processing in the first embodiment. However, in calculation of a parity bit string in S104, the parity bit string is calculated so that a bit string having a second predetermined number of bits is not generated but a bit string having the number of bits of a third predetermined number to be a value larger than the second predetermined number is generated. As such, the encoding rate is set lower than the encoding rate of the first transmission frame.

In this embodiment, when the retransmission frame is generated, a block encoder 110 uses the parity bit string calculated in S104 as the encoding block (S106). Depending on the encoding method, a common bit string may be included in a parity bit string calculated from the same information bit string. In this case, the common bit string may be omitted and an encoding block may be generated using only a portion extended from an original parity bit string in a calculated new parity bit string, that is, a part of an error correction bit string.

The subsequent processing is also the same as the processing in the first embodiment. That is, in the retransmission frame, a part or all of the parity bit string calculated in S104 is used as the encoding block, an encoding frame is generated from the encoding block (S108), frames are aggregated with other first transmission frame or retransmission frame (S110), and packet data is generated.

Figure 10:
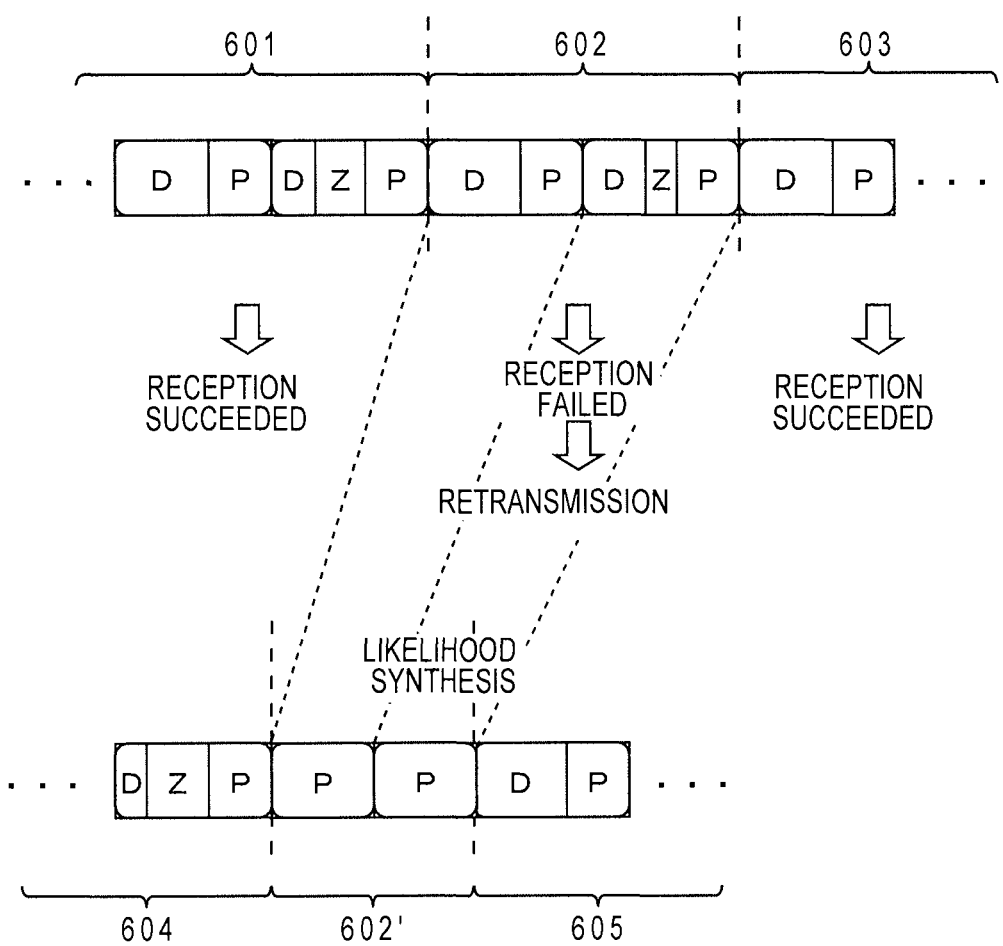
FIG. 10 is a diagram showing another example of likelihood synthesis according to an embodiment.

FIG. 10 is a diagram showing an example of the first transmission packet and the retransmission packet according to this embodiment. It is assumed that a situation is same as the situation in FIG. 9. For a MAC frame 602, in a retransmission packet, a MAC frame 602' having parity bits calculated with an encoding rate lower than an encoding rate of the first transmission MAC frame 602 as an encoding block is transmitted as a retransmission frame.

As can be seen from the drawing, because a length of a code word is the first predetermined number+second predetermined number of bits in the first transmission frame and the third predetermined number of bits in the retransmission frame, the length is not necessarily the same. However, boundaries of code words are matched with boundaries of frames by padding bit strings of the MAC frames 601 and 604.

As such, according to this embodiment, even in HARQ of the IR method, the boundaries of the code words can be matched with the boundaries of the frames by inserting padding and likelihood synthesis can be performed without decoding the information bit string. In addition, an encoding rate is set lower than an encoding rate of a first transmitted bit string for a frame to be retransmitted, so that the number of bits of an error correction bit string can be increased. As a result, wireless communication with higher reliability can be performed without deteriorating the bandwidth utilization efficiency.

Third Embodiment

In the individual embodiments described above, the case where, when a block is configured to have the same size by inserting padding bits and a code word is generated, data of other frames are configured not to be included in the same block, and boundaries of frames to be transmitted and boundaries of code words are matched with each other has been described. However, this embodiment further improves communication efficiency.

Figure 11:
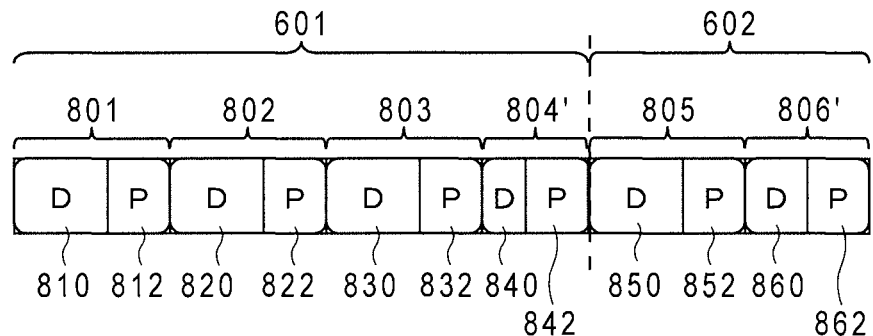
FIG. 11 is a diagram showing a frame aggregated bit string according to an embodiment.

FIG. 11 is a diagram schematically showing PHY data 550 of a transmission packet according to this embodiment. In FIG. 11, the same data as the data in FIG. 6 is transmitted. If FIGS. 6 and 11 are compared with each other, code words 801, 802, 803, and 805 are the same. However, code words 804 and 806 of FIG. 6 and code words 804' and 806' of FIG. 11 are different from each other.

The code words 804 and 806 store padding bit as a transmission frame. However, the code words 804' and 806' are configured to include an information bit string in which padding bits are not included and a padding bit string is omitted and a parity bit string. On the other hand, boundaries of the code words 804' and 806' are matched with boundaries of encoded MAC frames 601 and 602. Because the boundaries of the code words and the frames are matched with each other, similar to the embodiments described above, likelihood synthesis can be performed without decoding, that is, in a state in which a parity bit string is included, in a wireless communication device 1 of the reception side.

However, when the padding bit string is omitted as described above, the length of the code word at the end of each frame is not the predetermined length (the first predetermined number+the second predetermined number). For this reason, this information needs to be stored in a PHY header 500, for example. The information additionally stored in the PHY header 500 includes, for example, information such as a start address of each frame, a size and a sequence number of each frame, a length of a code word in each frame, the number of omitted padding bits in a block at the end of each frame, and information regarding a padding bit string and necessary information is selected from these information and is stored. The information is generated in a PHY header generator 104.

In the wireless communication device 1 of the reception side, the likelihood synthesis is performed for each frame by acquiring the information of the start address of each frame before the likelihood synthesis. When data is decoded, it is necessary to acquire information regarding the code word at the end of each frame before decoding and to properly restore the padding bit string. By executing decoding after restoring the padding bit string, error correction can be normally performed.

Figure 12:
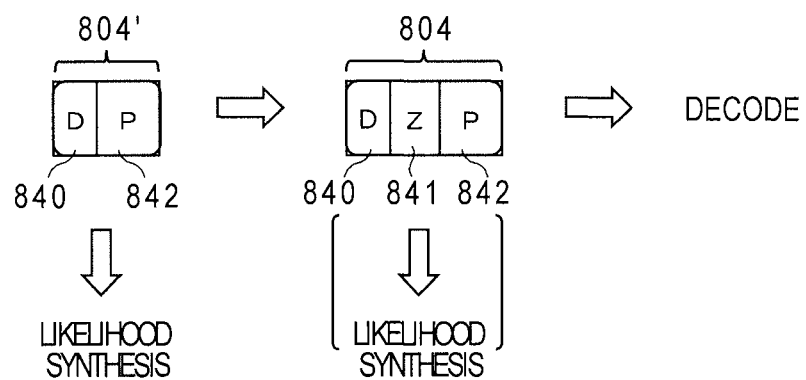
FIG. 12 is a diagram showing processing of an encoding frame of a frame end according to an embodiment.

FIG. 12 is a diagram schematically showing processing of the code word 804' in the wireless communication device 1 of the reception side. The likelihood synthesis of the frame including the code word 804' can be performed without restoring the padding bit. On the other hand, decoding of the code word 804' is executed after restoring the padding bits and performing conversion into the code word 804. Of course, the likelihood synthesis may be performed after performing conversion into code word 804. As such, at least before decoding, padding bits are restored, an error correction code is calculated, and decoding is performed.

Processing for generating an encoding block in this embodiment will be described using FIG. 7. The processing from S100 to S104 is the same as the processing in the first embodiment.

After calculating the parity bit string, a block encoder 101 generates an encoding block (S106). The encoding block is generated by combining the information bit string and the parity bit string. That is, for a block at the end of the frame to which the padding bit string has been added, a parity bit string is calculated after combining the information bit string and the padding bit string and the information bit string and the calculated parity bit string are combined to generate the encoding block. As such, the padding bit string is used in the calculation of the parity bits, but is not included in the encoding block.

As described above, according to this embodiment, the padding bits are inserted into the information of the frames and encoding is performed, so that the boundaries of the frames and the boundaries of the code words are matched with each other, the likelihood synthesis can be performed before decoding, that is, in a state where the parity bit string is included, and reception sensitivity of a signal can be improved. In addition, the padding bit string is configured not to be transmitted, so that the bandwidth utilization efficiency can be improved, in communication of packet data including frames.

Figure 13:
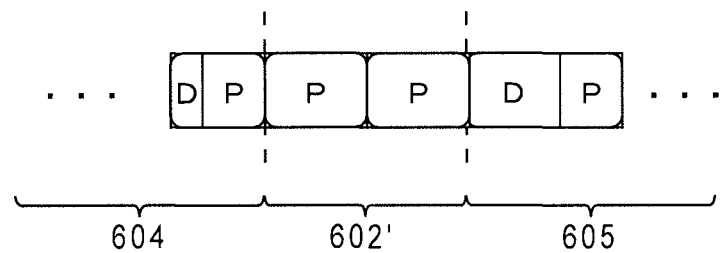
FIG. 13 is a diagram showing an example of a frame aggregated bit string according to an embodiment.

Like the second embodiment, even in this embodiment, the information bit string may not be included in the retransmission frame and data including information of the parity bit string may be transmitted. FIG. 13 is a diagram showing an example of the case where information of the information bit string is not transmitted. As shown in FIG. 13, a MAC frame 602' does not transmit the information of the information bit string. On the other hand, an encoding block at the end of a MAC frame 604 does not include a padding bit string.

Even in this state, because the boundary of the MAC frame can be matched with the boundary of the code word of the encoding block at the end of the MAC frame, the likelihood synthesis in the IR method can be performed, similar to the second embodiment.

Each of the embodiments described above is not limited to HARQ and can be applied to communication in which data is transmitted and likelihood synthesis of the data is performed at the reception side. The communication is not limited to wireless communication and can be used for wired communication. In addition, the communication can be used for communication between modules via a bus in a single device and can be used for communication performed between embedded devices in a system including the embedded devices.

Fourth Embodiment

Figure 14:
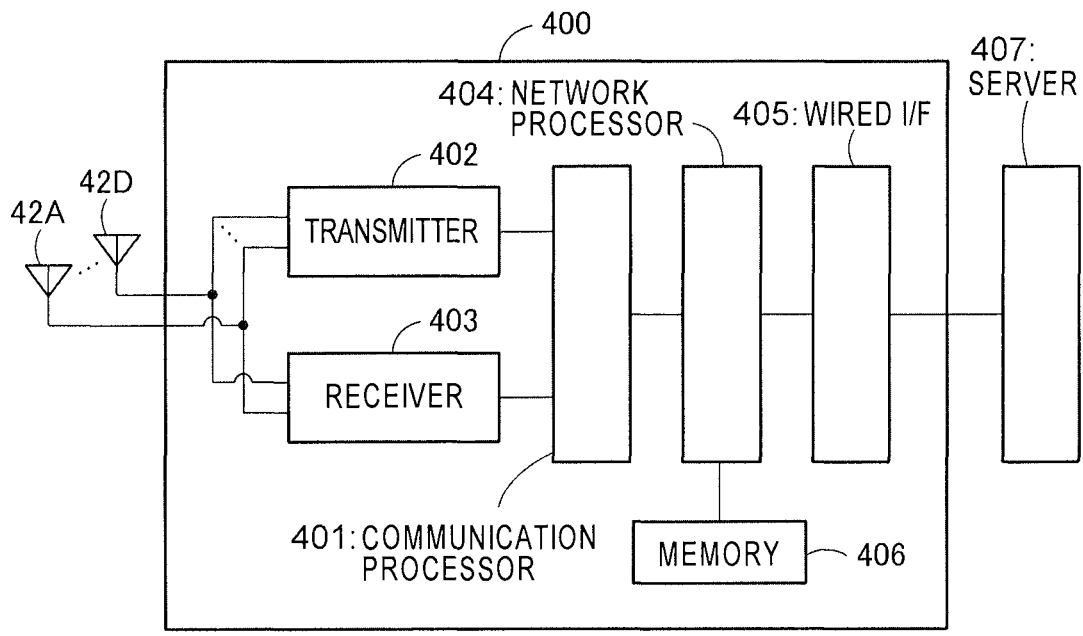
FIG. 14 is a functional block diagram of an access point or a terminal according to an embodiment.

FIG. 14 is a functional block diagram of a base station (access point) 400 according to the embodiment. The access point includes a communication processor 401, a transmitter 402, a receiver 403, antennas 42A, 42B, 42C, and 42D, a network processor 404, a wired I/F 405, and a memory 406. The access point 400 is connected to a server 407 through the wired I/F 405. The communication processor 401 has functions similar to the controller 101 in the first to third embodiments. The transmitter 402 and the receiver 403 have functions similar to the transmitter 102 and the receiver 103 described in the first to third embodiments. The communication processor 404 has functions similar to the upper layer processor in the first to third embodiments. The communication processor 401 may internally possess a buffer for transferring data to and from the network processor 404. The buffer may be a volatile memory, such as an SRAM or a DRAM, or may be a non-volatile memory, such as a NAND or an MRAM.

The network processor 404 controls data exchange with the communication processor 401, data writing and reading to and from the memory 406, and communication with the server 407 through the wired I/F 405. The network processor 404 may execute a higher communication process of the MAC layer, such as TCP/IP or UDP/IP, or a process of the application layer. The operation of the network processor may be performed through processing of software (program) by a processor, such as a CPU. The operation may be performed by hardware or may be performed by both of the software and the hardware.

For example, the communication processor 401 corresponds to a baseband integrated circuit, and the transmitter 402 and the receiver 403 correspond to an RF integrated circuit that transmits and receives frames. The communication processor 401 and the network processor 404 may be formed by one integrated circuit (one chip). Parts that execute processing of digital areas of the transmitter 402 and the receiver 403 and parts that execute processing of analog areas may be formed by different chips. The communication processor 401 may execute a higher communication process of the MAC layer, such as TCP/IP or UDP/IP. Although the number of antennas is four here, it is only necessary that at least one antenna is included.

The memory 406 saves data received from the server 407 and data received by the receiver 402. The memory 406 may be, for example, a volatile memory, such as a DRAM, or may be a non-volatile memory, such as a NAND or an MRAM. The memory 406 may be an SSD, an HDD, an SD card, an eMMC, or the like. The memory 406 may be provided outside of the base station 400.

The wired I/F 405 transmits and receives data to and from the server 407. Although the communication with the server 407 is performed through a wire in the present embodiment, the communication with the server 407 may be performed wirelessly.

The server 407 is a communication device that returns a response including requested data in response to reception of a data forward request for requesting transmission of the data. Examples of the server 407 include an HTTP server (Web server) and an FTP server. However, the server 407 is not limited to these as long as the server 407 has a function of returning the requested data. The server 407 may be a communication device operated by the user, such as a PC or a smartphone. The server 407 may wirelessly communicate with the base station 400.

When the STA belonging to the BSS of the base station 400 issues a forward request of data for the server 407, a packet regarding the data forward request is transmitted to the base station 400. The base station 400 receives the packet through the antennas 42A to 42D. The base station 400 causes the receiver 403 to execute the process of the physical layer and the like and causes the communication processor 401 to execute the process of the MAC layer and the like.

The network processor 404 analyzes the packet received from the communication processor 401. Specifically, the network processor 404 checks the destination IP address, the destination port number, and the like. When the data of the packet is a data forward request such as an HTTP GET request, the network processor 404 checks whether the data requested by the data forward request (for example, data in the URL requested by the HTTP GET request) is cached (stored) in the memory 406. A table associating the URL (or reduced expression of the URL, such as a hash value or an identifier substituting the URL) and the data is stored in the memory 406. The fact that the data is cached in the memory 406 will be expressed that the cache data exists in the memory 406.

When the cache data does not exist in the memory 406, the network processor 404 transmits the data forward request to the server 407 through the wired I/F 405. In other words, the network processor 404 substitutes the STA to transmit the data forward request to the server 407. Specifically, the network processor 404 generates an HTTP request and executes protocol processing, such as adding the TCP/IP header, to transfer the packet to the wired I/F 405. The wired I/F 405 transmits the received packet to the server 407.

The wired I/F 405 receives, from the server 407, a packet that is a response to the data forward request. From the IP header of the packet received through the wired I/F 405, the network processor 404 figures out that the packet is addressed to the STA and transfers the packet to the communication processor 401. The communication processor 401 executes processing of the MAC layer and the like for the packet. The transmitter 402 executes processing of the physical layer and the like and transmits the packet addressed to the STA from the antennas 42A to 42D. The network processor 404 associates the data received from the server 407 with the URL (or reduced expression of the URL) and saves the cache data in the memory 406.

When the cache data exists in the memory 406, the network processor 404 reads the data requested by the data forward request from the memory 406 and transmits the data to the communication processor 401. Specifically, the network processor 404 adds the HTTP header or the like to the data read from the memory 406 and executes protocol processing, such as adding the TCP/IP header, to transmit the packet to the communication processor 401. In this case, the transmitter IP address of the packet is set to the same IP address as the server, and the transmitter port number is also set to the same port number as the server (destination port number of the packet transmitted by the communication terminal), for example. Therefore, it can be viewed from the STA as if communication with the server 407 is established. The communication processor 401 executes processing of the MAC layer and the like for the packet. The transmitter 402 executes processing of the physical layer and the like and transmits the packet addressed to the STA from the antennas 42A to 42D.

According to the operation, frequently accessed data is responded based on the cache data saved in the memory 406, and the traffic between the server 407 and the base station 400 can be reduced. Note that the operation of the network processor 404 is not limited to the operation of the present embodiment. There is no problem in performing other operation when a general caching proxy is used, in which data is acquired from the server 407 in place of the STA, the data is cached in the memory 406, and a response is made from the cache data of the memory 406 for a data forward request of the same data.

The base station (access point) according to the present invention can be applied for the base station in the above-stated any embodiment. The transmission of the frame, the data or the packet used in the any embodiment may be carried out based on the cached data stored in the memory 406. Also, information obtained based on the frame, the data or the packet received by the base station in the first to seventh embodiments may be cached in the memory 406. The frame transmitted by the base station in the first to seventh embodiments may include the cached data or information based on the cached data. The information based on the cached data may include information on a size of the data, a size of a packet required for transmission of the data. The information based on the cached data may include a modulation scheme required for transmission of the data. The information based on the cached data may include information on existence or non-existence of data addressed to the terminal.

The base station (access point) according to the present invention can be applied for the base station in the above-stated any embodiment. In the present embodiment, although the base station with the cache function is described, a terminal (STA) with the cache function can also be realized by the same block configuration as FIG. 14. In this case, the wired I/F 405 may be omitted. The transmission, by the terminal, of the frame, the data or the packet used in the any embodiment may be carried out based on the cached data stored in the memory 406. Also, information obtained based on the frame, the data or the packet received by the terminal in the any embodiment may be cached in the memory 406. The frame transmitted by the terminal in the first embodiment may include the cached data or information based on the cached data. The information based on the cached data may include information on a size of the data, a size of a packet required for transmission of the data. The information based on the cached data may include a modulation scheme required for transmission of the data. The information based on the cached data may include information on existence or non-existence of data addressed to the terminal.

Fifth Embodiment

Figure 15:
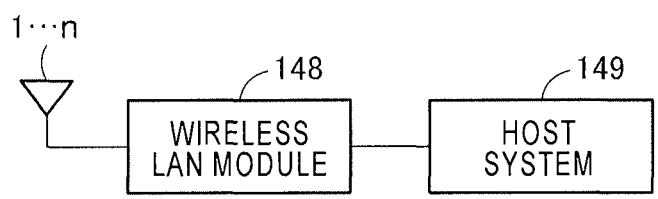
FIG. 15 is a diagram showing an example of an entire configuration of a terminal or an access point according to an embodiment.

FIG. 15 shows an example of entire configuration of a terminal (non-AP terminal) or a base station (AP). The example of configuration is just an example, and the present embodiment is not limited to this. The terminal or the base station includes one or a plurality of antennas 1 to n (n is an integer equal to or greater than 1), a wireless LAN module 148, and a host system 149. The wireless LAN module 148 corresponds to the wireless communication device according to any of the embodiments. The wireless LAN module 148 includes a host interface and is connected to the host system 149 through the host interface. Other than the connection to the host system 149 through the connection cable, the wireless LAN module 148 may be directly connected to the host system 149. The wireless LAN module 148 can be mounted on a substrate by soldering or the like and can be connected to the host system 149 through wiring of the substrate. The host system 149 uses the wireless LAN module 148 and the antennas 1 to n to communicate with external apparatuses according to an arbitrary communication protocol. The communication protocol may include the TCP/IP and a protocol of a layer higher than that. Alternatively, the TCP/IP may be mounted on the wireless LAN module 148, and the host system 149 may execute only a protocol in a layer higher than that. In this case, the configuration of the host system 149 can be simplified. Examples of the present terminal include a mobile terminal, a TV, a digital camera, a wearable device, a tablet, a smartphone, a game device, a network storage device, a monitor, a digital audio player, a Web camera, a video camera, a projector, a navigation system, an external adaptor, an internal adaptor, a set top box, a gateway, a printer server, a mobile access point, a router, an enterprise/service provider access point, a portable device, a hand-held device, a vehicle and so on.

The wireless LAN module 148 (or the wireless communication device) may have functions of other wireless communication standards such as LTE (Long Term Evolution), LTE-Advanced (standards for mobile phones) as well as the IEEE802.11.

Figure 16:
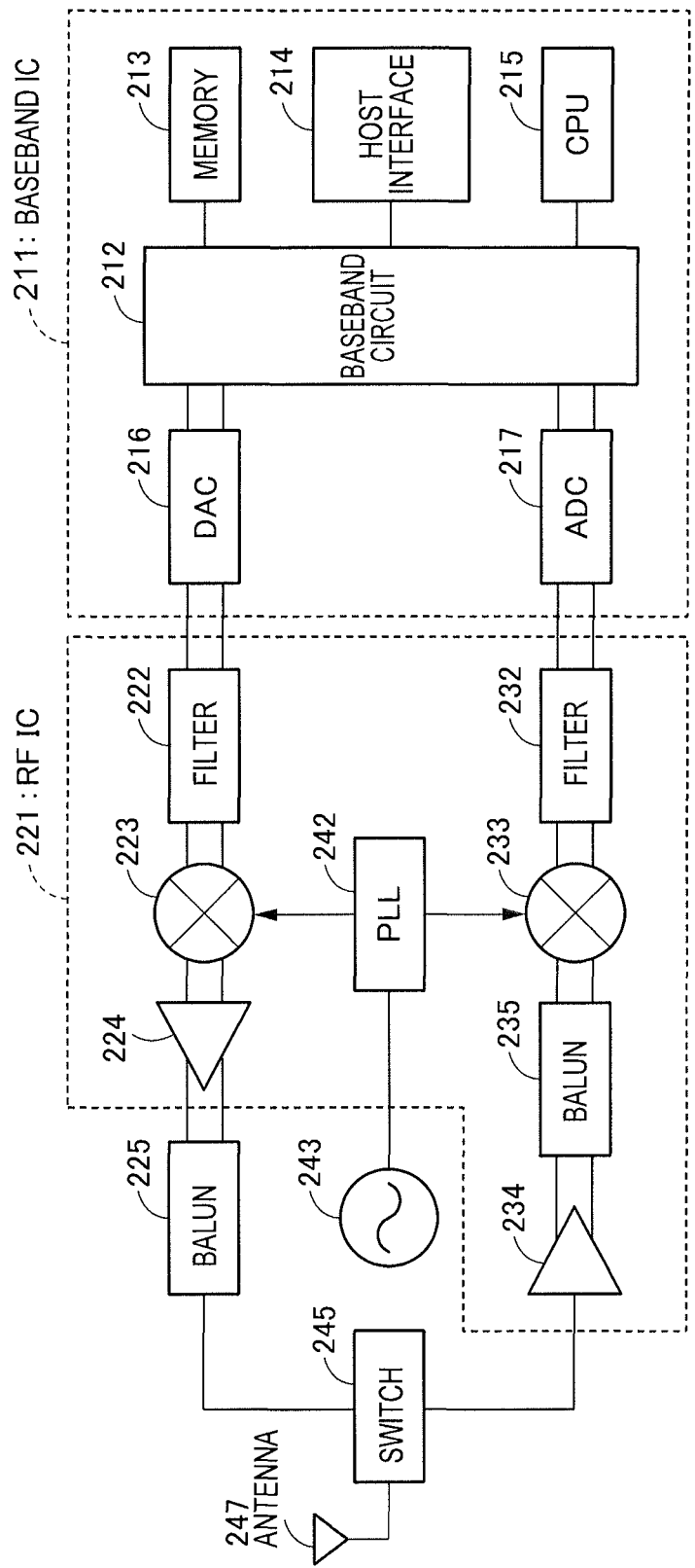
FIG. 16 is a diagram showing a hardware configuration example of a wireless communication device mounted on a terminal or an access point according to an embodiment.

FIG. 16 shows an example of hardware configuration of a WLAN module. The configuration shown in the figure may be applied for each case in where the wireless communication device is mounted in non-AP terminal or in AP (Access Point) provided correspondingly to each function. That is, the configuration can be applied as specific examples for one of the above mentioned wireless communication device. In the configuration shown in figure, at least one antenna is included although a plurality of antennas are included. In this case, a plurality of sets of a transmission system (216 and 222 to 225), a reception system (217, 232 to 235), a PLL 242, a crystal oscillator (reference signal source) 243, and a switch 245 may be arranged according to the antennas, and each set may be connected to a control circuit 212. One or both of the PLL 242 and the crystal oscillator 243 correspond to an oscillator according to the present embodiment.

The wireless LAN module (wireless communication device) includes a baseband IC (Integrated Circuit) 211, an RF (Radio Frequency) IC 221, a balun 225, the switch 245, and the antenna 247.

The baseband IC 211 includes the baseband circuit (control circuit) 212, a memory 213, a host interface 214, a CPU 215, a DAC (Digital to Analog Converter) 216, and an ADC (Analog to Digital Converter) 217.

The baseband IC 211 and the RF IC 221 may be formed on the same substrate. The baseband IC 211 and the RF IC 221 may be formed by one chip. Both or one of the DAC 216 and the ADC 217 may be arranged on the RF IC 221 or may be arranged on another IC. Both or one of the memory 213 and the CPU 215 may be arranged on an IC other than the baseband IC.

The memory 213 stores data to be transferred to and from the host system. The memory 213 also stores one or both of information to be transmitted to the terminal or the base station and information transmitted from the terminal or the base station. The memory 213 may also store a program necessary for the execution of the CPU 215 and may be used as a work area for the CPU 215 to execute the program. The memory 213 may be a volatile memory, such as an SRAM or a DRAM, or may be a non-volatile memory, such as a NAND or an MRAM.

The host interface 214 is an interface for connection to the host system. The interface can be anything, such as UART, SPI, SDIO, USB, or PCI Express.

The CPU 215 is a processor that executes a program to control the baseband circuit 212. The baseband circuit 212 mainly executes a process of the MAC layer and a process of the physical layer. One or both of the baseband circuit 212 and the CPU 215 correspond to the communication control apparatus that controls communication, the controller that controls communication, or controlling circuitry that controls communication.

At least one of the baseband circuit 212 or the CPU 215 may include a clock generator that generates a clock and may manage internal time by the clock generated by the clock generator.

For the process of the physical layer, the baseband circuit 212 performs addition of the physical header, coding, encryption, modulation process (which may include MIMO modulation), and the like of the frame to be transmitted and generates, for example, two types of digital baseband signals (hereinafter, "digital I signal" and "digital Q signal").

The DAC 216 performs DA conversion of signals input from the baseband circuit 212. More specifically, the DAC 216 converts the digital I signal to an analog I signal and converts the digital Q signal to an analog Q signal. Note that a single system signal may be transmitted without performing quadrature modulation. When a plurality of antennas are included, and single system or multi-system transmission signals equivalent to the number of antennas are to be distributed and transmitted, the number of provided DACs and the like may correspond to the number of antennas.

The RF IC 221 is, for example, one or both of an RF analog IC and a high frequency IC. The RF IC 221 includes a filter 222, a mixer 223, a preamplifier (PA) 224, the PLL (Phase Locked Loop) 242, a low noise amplifier (LNA) 234, a balun 235, a mixer 233, and a filter 232. Some of the elements may be arranged on the baseband IC 211 or another IC. The filters 222 and 232 may be bandpass filters or low pass filters.

The filter 222 extracts a signal of a desired band from each of the analog I signal and the analog Q signal input from the DAC 216. The PLL 242 uses an oscillation signal input from the crystal oscillator 243 and performs one or both of division and multiplication of the oscillation signal to thereby generate a signal at a certain frequency synchronized with the phase of the input signal. Note that the PLL 242 includes a VCO (Voltage Controlled Oscillator) and uses the VCO to perform feedback control based on the oscillation signal input from the crystal oscillator 243 to thereby obtain the signal at the certain frequency. The generated signal at the certain frequency is input to the mixer 223 and the mixer 233. The PLL 242 is equivalent to an example of an oscillator that generates a signal at a certain frequency.

The mixer 223 uses the signal at the certain frequency supplied from the PLL 242 to up-convert the analog I signal and the analog Q signal passed through the filter 222 into a radio frequency. The preamplifier (PA) 224 amplifies the analog I signal and the analog Q signal at the radio frequency generated by the mixer 223, up to desired output power. The balun 225 is a converter for converting a balanced signal (differential signal) to an unbalanced signal (single-ended signal). Although the balanced signal is handled by the RF IC 221, the unbalanced signal is handled from the output of the RF IC 221 to the antenna 247. Therefore, the balun 225 performs the signal conversions.

The switch 245 is connected to the balun 225 on the transmission side during the transmission and is connected to the LNA 234 or the RF IC 221 on the reception side during the reception. The baseband IC 211 or the RF IC 221 may control the switch 245. There may be another circuit that controls the switch 245, and the circuit may control the switch 245.

The analog I signal and the analog Q signal at the radio frequency amplified by the preamplifier 224 are subjected to balanced-unbalanced conversion by the balun 225 and are then emitted as radio waves to the space from the antenna 247.

The antenna 247 may be a chip antenna, may be an antenna formed by wiring on a printed circuit board, or may be an antenna formed by using a linear conductive element.

The LNA 234 in the RF IC 221 amplifies a signal received from the antenna 247 through the switch 245 up to a level that allows demodulation, while maintaining the noise low.

The balun 235 performs unbalanced-balanced conversion of the signal amplified by the low noise amplifier (LNA) 234. The mixer 233 uses the signal at the certain frequency input from the PLL 242 to down-convert, to a baseband, the reception signal converted to a balanced signal by the balun 235. More specifically, the mixer 233 includes a unit that generates carrier waves shifted by a phase of 90 degrees based on the signal at the certain frequency input from the PLL 242. The mixer 233 uses the carrier waves shifted by a phase of 90 degrees to perform quadrature demodulation of the reception signal converted by the balun 235 and generates an I (In-phase) signal with the same phase as the reception signal and a Q (Quad-phase) signal with the phase delayed by 90 degrees. The filter 232 extracts signals with desired frequency components from the I signal and the Q signal. Gains of the I signal and the Q signal extracted by the filter 232 are adjusted, and the I signal and the Q signal are output from the RF IC 221.

The ADC 217 in the baseband IC 211 performs AD conversion of the input signal from the RF IC 221. More specifically, the ADC 217 converts the I signal to a digital I signal and converts the Q signal to a digital Q signal. Note that a single system signal may be received without performing quadrature demodulation.

When a plurality of antennas are provided, the number of provided ADCs may correspond to the number of antennas. Based on the digital I signal and the digital Q signal, the baseband circuit 212 executes a process of the physical layer and the like, such as demodulation process, error correcting code process, and process of physical header, and obtains a frame. The baseband circuit 212 applies a process of the MAC layer to the frame. Note that the baseband circuit 212 may be configured to execute a process of TCP/IP when the TCP/IP is implemented.

Sixth Embodiment

Figure 17:
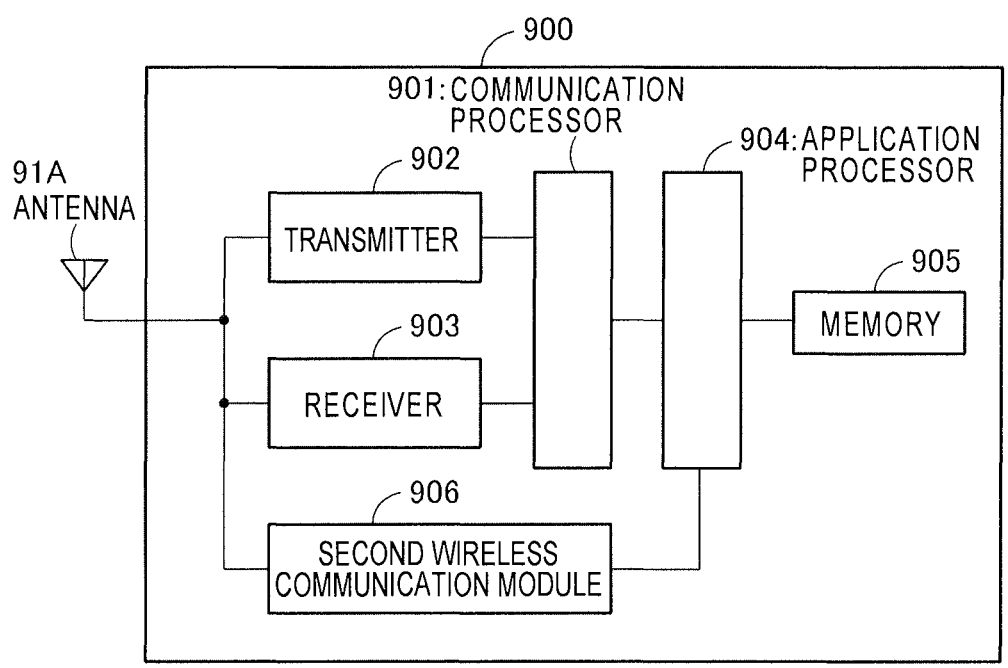
FIG. 17 is a functional block diagram of a terminal or an access point according to an embodiment.

FIG. 17 is a functional block diagram of the terminal (STA) 900 according to the present embodiment. The STA 900 includes a communication processor 901, a transmitter 902, a receiver 903, an antenna 91A, an application processor 904 a memory 905, and a second wireless communication module 906. The base station (AP) may have the similar configuration.

The communication processor 901 has the functions similar to MAC/PHY manager as described in the first embodiment. The transmitter 902 and the receiver 903 have the functions similar to PHY processor and MAC processor as described in the first embodiment. The transmitter 902 and the receiver 903 may perform analog domain processing in PHY processor and the communication processor 901 may perform digital domain processing in MAC processor and digital domain processing in PHY processor. The communication processor 901 may internally possess a buffer for transferring data to and from the application processor 904. The buffer may be a volatile memory, such as an SRAM or a DRAM, or may be a non-volatile memory, such as a NAND or an MRAM.

The application processor 904 performs wireless communication through the communication processor 901, data writing or reading with the memory 905 and wireless communication through the second wireless communication module 906. The application processor 904 performs various processing such as Web browsing or multimedia processing of video or music or the like. The operation of application processor 904 may be carried out by software (program) processing by a processor such as CPU, by hardware, or both of them.

The memory 905 saves data received at the receiver 903 or the second wireless communication module 906, or data processed by the application processor 904. The memory 905 may be a volatile memory such as a DRAM or may be a non-volatile memory, such as a NAND or an MRAM. The memory 905 may be an SSD, an HDD, an SD card, or an eMMC or the like. The memory 905 may be arranged out of the access point 900.

The second wireless communication module 906 has the similar configuration to the WLAN module as shown in FIG. 15 or FIG. 16 as one example. The second wireless communication module 906 performs wireless communication in a different manner than that realized by the communication processor 901, the transmitter 902 and the receiver 903. For example, in a case that the communication processor 901, the transmitter 902 and the receiver 903 perform wireless communication in compliance with IEEE802.11 standard, the second wireless communication module 906 may perform wireless communication in compliance with another wireless communication standard such as Bluetooth (trademark), LTE, Wireless HD or the like. The communication processor 901, the transmitter 902, the receiver 903 may perform wireless communication at 2.4 GHz/5 GHz and the second wireless communication module 906 may perform wireless communication at 60 GHz.

In the embodiment, one antenna is arranged and shared by the transmitter 902, the receiver 903 and the second wireless communication module 906. A switch controlling for connection destination of the antenna 91A may be arranged and thereby the antenna may be shared. A plurality of antennas may be arranged and may be employed by the transmitter 902, the receiver 903, and the second wireless communication module 906, respectively.

As one example, the communication processor 901 corresponds to an integrated circuit, and the transmitter 902 and the receiver 903 corresponds to an RF integrated circuit which transmits and receives frames. A set of the communication processor 901 and the application processor 904 is configured by one integrated circuit (1 chip). A part of the second wireless communication module 906 and the application processor 904 may be configured by one integrated circuit (1 chip).

The application processor performs control of wireless communication through the communication processor 901 and wireless communication through the second wireless communication module 906.

Seventh Embodiment

Figure 18A:
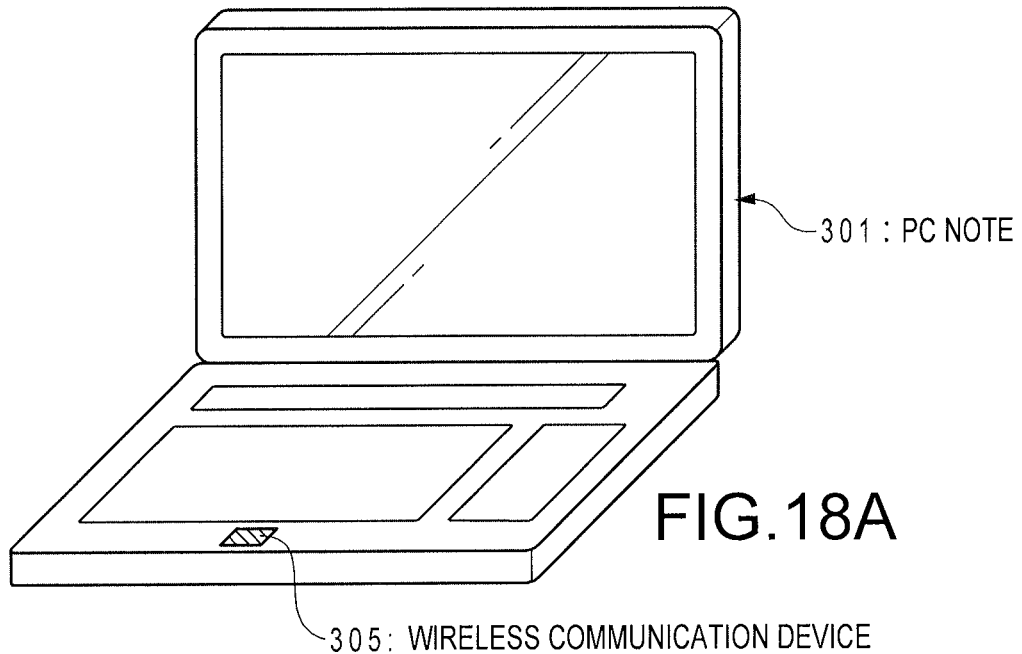
FIGS. 18A and 18B are perspective views of a terminal according to an embodiment.
Figure 18B:
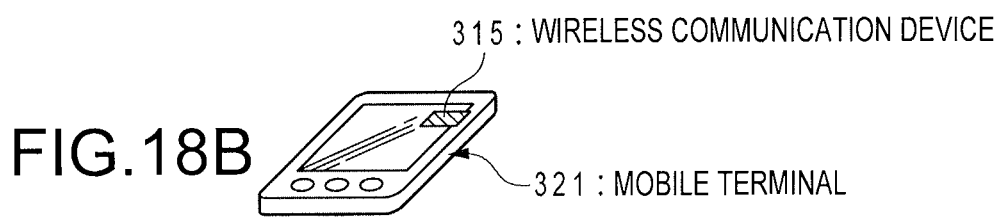

FIG. 18A and FIG. 18B are perspective views of wireless terminal according to the present embodiment. The wireless terminal in FIG. 18A is a notebook PC 301 and the wireless communication device (or a wireless device) in FIG. 18B is a mobile terminal 321. Each of them corresponds to one form of a terminal (which may indicate a base station). The notebook PC 301 and the mobile terminal 321 are equipped with wireless communication devices 305 and 315, respectively. The wireless communication device provided in a terminal (which may indicate a base station) which has been described above can be used as the wireless communication devices 305 and 315. A wireless terminal carrying a wireless communication device is not limited to notebook PCs and mobile terminals. For example, it can be installed in a TV, a digital camera, a wearable device, a tablet, a smart phone, a gaming device, a network storage device, a monitor, a digital audio player, a web camera, a video camera, a projector, a navigation system, an external adapter, an internal adapter, a set top box, a gateway, a printer server, a mobile access point, a router, an enterprise/service provider access point, a portable device, a handheld device, a vehicle and so on.

Figure 19:
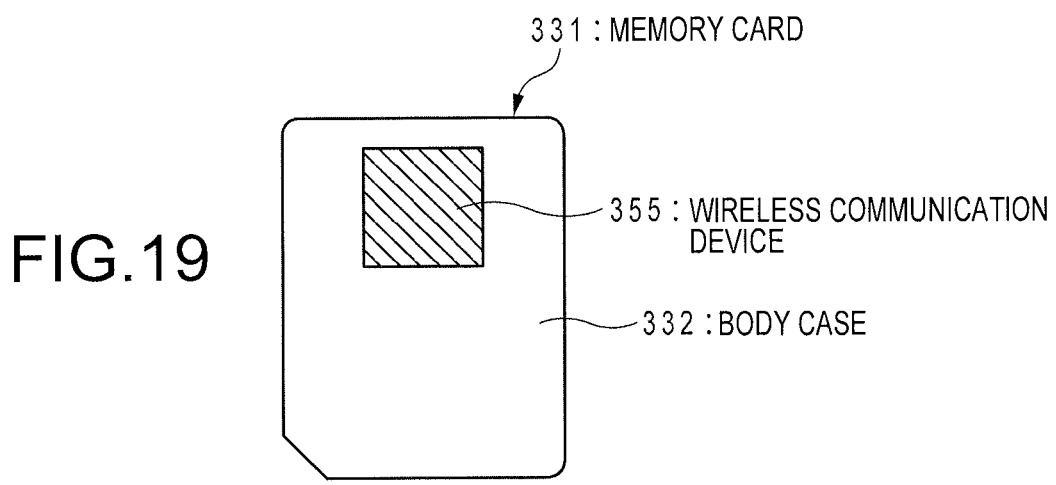
FIG. 19 is a diagram showing a memory card according to an embodiment.

Moreover, a wireless communication device installed in a terminal (which may indicate a base station) can also be provided in a memory card. FIG. 19 illustrates an example of a wireless communication device mounted on a memory card. A memory card 331 contains a wireless communication device 355 and a body case 332. The memory card 331 uses the wireless communication device 355 for wireless communication with external devices. Here, in FIG. 19, the description of other installed elements (for example, a memory, and so on) in the memory card 331 is omitted.

Eighth Embodiment

In the present embodiment, a bus, a processor unit and an external interface unit are provided in addition to the configuration of the wireless communication device (the wireless communication device of the terminal (which may indicate the base station)) according to any of the above embodiments. The processor unit and the external interface unit are connected with an external memory (a buffer) through the bus. A firmware operates the processor unit. Thus, by adopting a configuration in which the firmware is included in the wireless communication device, the functions of the wireless communication device can be easily changed by rewriting the firmware. The processing unit in which the firmware operates may be a processor that performs the process of the communication controlling device or the control unit according to the present embodiment, or may be another processor that performs a process relating to extending or altering the functions of the process of the communication controlling device or the control unit. The processing unit in which the firmware operates may be included in the access point or the wireless terminal according to the present embodiment. Alternatively, the processing unit may be included in the integrated circuit of the wireless communication device installed in the access point, or in the integrated circuit of the wireless communication device installed in the wireless terminal.

Ninth Embodiment

In the present embodiment, a clock generating unit is provided in addition to the configuration of the wireless communication device (the wireless communication device of the terminal (which may indicate the base station)) according to any of the above embodiments. The clock generating unit generates a clock and outputs the clock from an output terminal to the exterior of the wireless communication device. Thus, by outputting to the exterior the clock generated inside the wireless communication device and operating the host by the clock output to the exterior, it is possible to operate the host and the wireless communication device in a synchronized manner.

Tenth Embodiment

In the present embodiment, a power source unit, a power source controlling unit and a wireless power feeding unit are included in addition to the configuration of the wireless communication device (the wireless communication device of the terminal (which may indicate the base station)) according to any of the above embodiments. The power supply controlling unit is connected to the power source unit and to the wireless power feeding unit, and performs control to select a power source to be supplied to the wireless communication device. Thus, by adopting a configuration in which the power source is included in the wireless communication device, power consumption reduction operations that control the power source are possible.

Eleventh Embodiment

In the present embodiment, a SIM card is added to the configuration of the wireless communication device according to any of the above embodiments. For example, the SIM card is connected with the controller, the transmitter, the receiver or plural of them in the wireless communication device. Thus, by adopting a configuration in which the SIM card is included in the wireless communication device, authentication processing can be easily performed.

Twelfth Embodiment

In the present embodiment, a video image compressing/decompressing unit is added to the configuration of the wireless communication device according to any of the above embodiments. The video image compressing/decompressing unit is connected to the bus. Thus, by adopting a configuration in which the video image compressing/decompressing unit is included in the wireless communication device, transmitting a compressed video image and decompressing a received compressed video image can be easily done.

Thirteenth Embodiment

In the present embodiment, an LED unit is added to the configuration of the wireless communication device (the wireless communication device of the terminal (which may indicate the base station)) according to any of the above embodiments. For example, the LED unit is connected to the controller, the transmitter, the receiver or plural of them in the wireless communication device. Thus, by adopting a configuration in which the LED unit is included in the wireless communication device, notifying the operation state of the wireless communication device to the user can be easily done.

Fourteenth Embodiment

In the present embodiment, a vibrator unit is included in addition to the configuration of the wireless communication device wireless communication device (the wireless communication device of the terminal (which may indicate the base station)) according to any of the above embodiments. For example, the vibrator unit is connected to at least one of the controller, the transmitter, the receiver or plural of them in the wireless communication device. Thus, by adopting a configuration in which the vibrator unit is included in the wireless communication device, notifying the operation state of the wireless communication device to the user can be easily done.

Fifteenth Embodiment

In the present embodiment, the configuration of the wireless communication device includes a display in addition to the configuration of the wireless communication device (the wireless communication device of the terminal (which may indicate the base station)) according to any one of the above embodiments. The display may be connected to the controller, the transmitter, the receiver or plural of them in the wireless communication device via a bus (not shown). As seen from the above, the configuration including the display to display the operation state of the wireless communication device on the display allows the operation status of the wireless communication device to be easily notified to a user.

Sixteenth Embodiment

In the present embodiment, [1] the frame type in the wireless communication system, [2] a technique of disconnection between wireless communication devices, [3] an access scheme of a wireless LAN system and [4] a frame interval of a wireless LAN are described.

[1] Frame Type in Communication System

Generally, as mentioned above, frames treated on a wireless access protocol in a wireless communication system are roughly divided into three types of the data frame, the management frame and the control frame. These types are normally shown in a header part which is commonly provided to frames. As a display method of the frame type, three types may be distinguished in one field or may be distinguished by a combination of two fields. In IEEE 802.11 standard, identification of a frame type is made based on two fields of Type and Subtype in the Frame Control field in the header part of the MAC frame. The Type field is one for generally classifying frames into a data frame, a management frame, or a control frame and the Subtype field is one for identifying more detailed type in each of the classified frame types such as a beacon frame belonging to the management frame.

The management frame is a frame used to manage a physical communication link with a different wireless communication device. For example, there are a frame used to perform communication setting with the different wireless communication device or a frame to release communication link (that is, to disconnect the connection), and a frame related to the power save operation in the wireless communication device.

The data frame is a frame to transmit data generated in the wireless communication device to the different wireless communication device after a physical communication link with the different wireless communication device is established. The data is generated in a higher layer of the present embodiment and generated by, for example, a user's operation.

The control frame is a frame used to perform control at the time of transmission and reception (exchange) of the data frame with the different wireless communication device. A response frame transmitted for the acknowledgment in a case where the wireless communication device receives the data frame or the management frame, belongs to the control frame. The response frame is, for example, an ACK frame or a BlockACK frame. The RTS frame and the CTS frame are also the control frame.

These three types of frames are subjected to processing based on the necessity in the physical layer and then transmitted as physical packets via an antenna. In IEEE 802.11 standard (including the extended standard such as IEEE Std 802.11ac-2013), an association process is defined as one procedure for connection establishment. The association request frame and the association response frame which are used in the procedure are a management frame. Since the association request frame and the association response frame is the management frame transmitted in a unicast scheme, the frames causes the wireless communication terminal in the receiving side to transmit an ACK frame being a response frame. The ACK frame is a control frame as described in the above.

[2] Technique of Disconnection Between Wireless Communication Devices

For disconnection of the connection (release), there are an explicit technique and an implicit technique. As the explicit technique, a frame to disconnect any one of the connected wireless communication devices is transmitted. This frame corresponds to Deauthentication frame defined in IEEE 802.11 standard and is classified into the management frame. Normally, it is determined that the connection is disconnected at the timing of transmitting the frame to disconnect the connection in a wireless communication device on the side to transmit the frame and at the timing of receiving the frame to disconnect the connection in a wireless communication device on the side to receive the frame. Afterward, it returns to the initial state in a communication phase, for example, a state to search for a wireless communication device of the communicating partner. In a case that the wireless communication base station disconnects with a wireless communication terminal, for example, the base station deletes information on the wireless communication device from a connection management table if the base station holds the connection management table for managing wireless communication terminals which entries into the BSS of the base station-self. For example, in a case that the base station assigns an AID to each wireless communication terminal which entries into the BSS at the time when the base station permitted each wireless communication terminal to connect to the base station-self in the association process, the base station deletes the held information related to the AID of the wireless communication terminal disconnected with the base station and may release the AID to assign it to another wireless communication device which newly entries into the BSS. On the other hand, as the implicit technique, it is determined that the connection state is disconnected in a case where frame transmission (transmission of a data frame and management frame or transmission of a response frame with respect to a frame transmitted by the subject device) is not detected from a wireless communication device of the connection partner which has established the connection for a certain period. Such a technique is provided because, in a state where it is determined that the connection is disconnected as mentioned above, a state is considered where the physical wireless link cannot be secured, for example, the communication distance to the wireless communication device of the connection destination is separated and the radio signals cannot be received or decoded. That is, it is because the reception of the frame to disconnect the connection cannot be expected.

As a specific example to determine the disconnection of connection in an implicit method, a timer is used. For example, at the time of transmitting a data frame that requests an acknowledgment response frame, a first timer (for example, a retransmission timer for a data frame) that limits the retransmission period of the frame is activated, and, if the acknowledgement response frame to the frame is not received until the expiration of the first timer (that is, until a desired retransmission period passes), retransmission is performed. When the acknowledgment response frame to the frame is received, the first timer is stopped.

On the other hand, when the acknowledgment response frame is not received and the first timer expires, for example, a management frame to confirm whether a wireless communication device of a connection partner is still present (in a communication range) (in other words, whether a wireless link is secured) is transmitted, and, at the same time, a second timer (for example, a retransmission timer for the management frame) to limit the retransmission period of the frame is activated. Similarly to the first timer, even in the second timer, retransmission is performed if an acknowledgment response frame to the frame is not received until the second timer expires, and it is determined that the connection is disconnected when the second timer expires.

Alternatively, a third timer is activated when a frame is received from a wireless communication device of the connection partner, the third timer is stopped every time the frame is newly received from the wireless communication device of the connection partner, and it is activated from the initial value again. When the third timer expires, similarly to the above, a management frame to confirm whether the wireless communication device of the connection party is still present (in a communication range) (in other words, whether a wireless link is secured) is transmitted, and, at the same time, a second timer (for example, a retransmission timer for the management frame) to limit the retransmission period of the frame is activated. Even in this case, retransmission is performed if an acknowledgment response frame to the frame is not received until the second timer expires, and it is determined that the connection is disconnected when the second timer expires. The latter management frame to confirm whether the wireless communication device of the connection partner is still present may differ from the management frame in the former case. Moreover, regarding the timer to limit the retransmission of the management frame in the latter case, although the same one as that in the former case is used as the second timer, a different timer may be used.

[3] Access Scheme of Wireless LAN System

For example, there is a wireless LAN system with an assumption of communication or competition with a plurality of wireless communication devices. CSMA/CA is set as the basis of an access scheme in IEEE802.11 (including an extension standard or the like) wireless LAN. In a scheme in which transmission by a certain wireless communication device is grasped and transmission is performed after a fixed time from the transmission end, simultaneous transmission is performed in the plurality of wireless communication devices that grasp the transmission by the wireless communication device, and, as a result, radio signals collide and frame transmission fails. By grasping the transmission by the certain wireless communication device and waiting for a random time from the transmission end, transmission by the plurality of wireless communication devices that grasp the transmission by the wireless communication device stochastically disperses. Therefore, if the number of wireless communication devices in which the earliest time in a random time is subtracted is one, frame transmission by the wireless communication device succeeds and it is possible to prevent frame collision. Since the acquisition of the transmission right based on the random value becomes impartial between the plurality of wireless communication devices, it can say that a scheme adopting Collision Avoidance is a suitable scheme to share a radio medium between the plurality of wireless communication devices.

[4] Frame Interval of Wireless LAN

The frame interval of IEEE802.11 wireless LAN is described. There are several types of frame intervals used in IEEE802.11 wireless LAN, such as distributed coordination function interframe space (DIFS), arbitration interframe space (AIFS), point coordination function interframe space (PIFS), short interframe space (SIFS), extended interframe space (EIFS) and reduced interframe space (RIFS).

The definition of the frame interval is defined as a continuous period that should confirm and open the carrier sensing idle before transmission in IEEE802.11 wireless LAN, and a strict period from a previous frame is not discussed. Therefore, the definition is followed in the explanation of IEEE802.11 wireless LAN system. In IEEE802.11 wireless LAN, a waiting time at the time of random access based on CSMA/CA is assumed to be the sum of a fixed time and a random time, and it can say that such a definition is made to clarify the fixed time.

DIFS and AIFS are frame intervals used when trying the frame exchange start in a contention period that competes with other wireless communication devices on the basis of CSMA/CA. DIFS is used in a case where priority according to the traffic type is not distinguished, AIFS is used in a case where priority by traffic identifier (TID) is provided.

Since operation is similar between DIFS and AIFS, an explanation below will mainly use AIFS. In IEEE802.11 wireless LAN, access control including the start of frame exchange in the MAC layer is performed. In addition, in a case where QoS (Quality of Service) is supported when data is transferred from a higher layer, the traffic type is notified together with the data, and the data is classified for the priority at the time of access on the basis of the traffic type. The class at the time of this access is referred to as "access category (AC)". Therefore, the value of AIFS is provided every access category.

PIFS denotes a frame interval to enable access which is more preferential than other competing wireless communication devices, and the period is shorter than the values of DIFS and AIFS. SIFS denotes a frame interval which can be used in a case where frame exchange continues in a burst manner at the time of transmission of a control frame of a response system or after the access right is acquired once. EIFS denotes a frame interval caused when frame reception fails (when the received frame is determined to be error).

RIFS denotes a frame interval which can be used in a case where a plurality of frames are consecutively transmitted to the same wireless communication device in a burst manner after the access right is acquired once, and a response frame from a wireless communication device of the transmission partner is not requested while RIFS is used.

Figure 20:
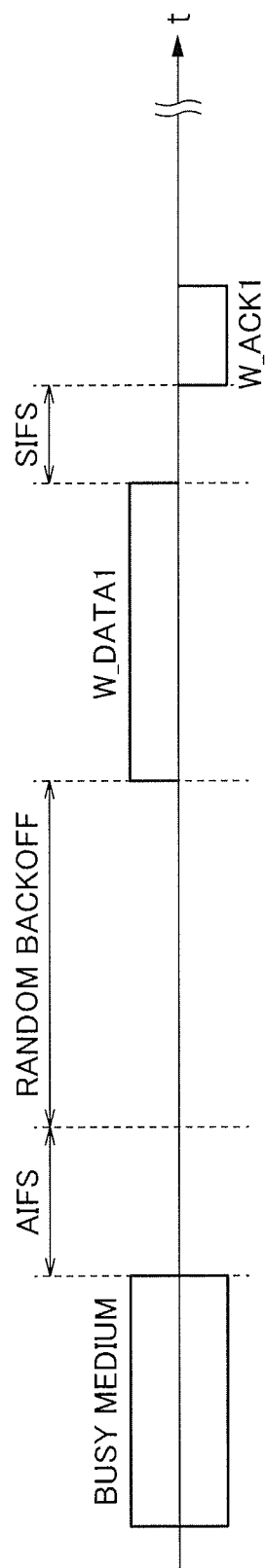
FIG. 20 is a diagram showing an example of a frame exchange in a contention period according to an embodiment.

Here, FIG. 20 illustrates one example of frame exchange in a competitive period based on the random access in IEEE802.11 wireless LAN.

When a transmission request of a data frame (W_DATA1) is generated in a certain wireless communication device, a case is assumed where it is recognized that a medium is busy (busy medium) as a result of carrier sensing. In this case, AIFS of a fixed time is set from the time point at which the carrier sensing becomes idle, and, when a random time (random backoff) is set afterward, data frame W_DATA1 is transmitted to the communicating partner.

The random time is acquired by multiplying a slot time by a pseudorandom integer led from uniform distribution between contention windows (CW) given by integers from 0. Here, what multiplies CW by the slot time is referred to as "CW time width". The initial value of CW is given by CWmin, and the value of CW is increased up to CWmax every retransmission. Similarly to AIFS, both CWmin and CWmax have values every access category. In a wireless communication device of transmission destination of W_DATA1, when reception of the data frame succeeds, a response frame (W_ACK1) is transmitted after SIFS from the reception end time point. If it is within a transmission burst time limit when W_ACK1 is received, the wireless communication device that transmits W_DATA1 can transmit the next frame (for example, W_DATA2) after SIFS.

Although AIFS, DIFS, PIFS and EIFS are functions between SIFS and the slot-time, SIFS and the slot time are defined every physical layer. Moreover, although parameters whose values being set according to each access category, such as AIFS, CWmin and CWmax, can be set independently by a communication group (which is a basic service set (BSS) in IEEE802.11 wireless LAN), the default values are defined.

For example, in the definition of 802.11ac, with an assumption that SIFS is 16 μs and the slot time is 9 μs, and thereby PIFS is 25 μs, DIFS is 34 μs, the default value of the frame interval of an access category of BACKGROUND (AC_BK) in AIFS is 79 μs, the default value of the frame interval of BEST EFFORT (AC_BE) is 43 μs, the default value of the frame interval between VIDEO(AC_VI) and VOICE(AC_VO) is 34 μs, and the default values of CWmin and CWmax are 31 and 1023 in AC_BK and AC_BE, 15 and 31 in AC_VI and 7 and 15 in AC_VO. Here, EIFS denotes the sum of SIFS, DIFS, and the time length of a response frame transmitted at the lowest mandatory physical rate. In the wireless communication device which can effectively takes EIFS, it may estimate an occupation time length of a PHY packet conveying a response frame directed to a PHY packet due to which the EIFS is caused and calculates a sum of SIFS, DIFS and the estimated time to take the EIFS. Note that the frames described in the embodiments may indicate not only things called frames in, for example, IEEE 802.11 standard, but also things called packets, such as Null Data Packets.

The terms used in each embodiment should be interpreted broadly. For example, the term "processor" may encompass a general purpose processor, a central processing unit (CPU), a microprocessor, a digital signal processor (DSP), a controller, a microcontroller, a state machine, and so on. According to circumstances, a "processor" may refer to an application specific integrated circuit (ASIC), a field programmable gate array (FPGA), and a programmable logic device (PLD), etc. The term "processor" may refer to a combination of processing devices such as a plurality of microprocessors, a combination of a DSP and a microprocessor, or one or more microprocessors in conjunction with a DSP core.

As another example, the term "memory" may encompass any electronic component which can store electronic information. The "memory" may refer to various types of media such as a random access memory (RAM), a read-only memory (ROM), a programmable read-only memory (PROM), an erasable programmable read only memory (EPROM), an electrically erasable PROM (EEPROM), a non-volatile random access memory (NVRAM), a flash memory, and a magnetic or optical data storage, which are readable by a processor. It can be said that the memory electronically communicates with a processor if the processor read and/or write information for the memory. The memory may be arranged within a processor and also in this case, it can be said that the memory electronically communication with the processor. The circuitry" may refer one or more electric circuits disposed on a single chip, or may refer one or more electric circuits disposed on a plurality of chips or a plurality of devices in a dispersed manner.

In the specification, the expression "at least one of a, b or c" is an expression to encompass not only "a", "b", "c", "a and b", "a and c", "b and c", "a, b and c" or any combination thereof but also a combination of at least a plurality of same elements such as "a and a", "a, b and b" or "a, a, b, b, c and c". Also, the expression is an expression to allow a set including an element other than "a", "b" and "c" such as "a, b, c, and d".

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions.

The invention claimed is:

1. A wireless communication apparatus comprising:
controlling circuitry configured to:
divide first data of a first frame for a transmission packet into first bit strings by a unit of a first number of bits;
divide second data of a second frame for the transmission packet into second bit strings by a unit of the first number of bits;
add at least one padding bit to one of the first bit strings according to a difference between (1) a number of bits of the one of the first bit strings, and (2) the first number of bits, when the one of the first bit strings has a number of bits less than the first number of bits;
add at least one padding bit to one of the second bit strings according to a difference between (1) a number of bits of the one of the second bit strings, and (2) the first number of bits, when the one of the second bit strings has a number of bits less than the first number of bits;
add first error correction code parity bits strings codes to the first bit strings to generate first encoded blocks, wherein the first error correction code parity bits strings have a second number of bits,
add second error correction code parity bits strings to the second bit strings to generate second encoded blocks, wherein the second error correction code parity bits strings have the second number of bits;
combine the first encoded blocks to generate a first encoded frame, wherein the first encoded frame has a length being an integral multiple of sum of the first number and the second number that matches a MAC frame boundary;
combine the second encoded blocks to generate a second encoded frame, wherein the second encoded frame has a length being an integral multiple of the sum of the first number and the second number that matches the MAC frame boundary; and
aggregate the first encoded frame and the second encoded frame following the first encoded frame to generate the transmission packet having encoded frames including the first encoded frame and the second encoded frame; and
transmitter circuitry configured to transmit the transmission packet.

2. The wireless communication apparatus according to claim 1, wherein the controlling circuitry is configured to combine a bit string of the block having the first number of bits to which is added the padding bits so that a block having less bits than the first number becomes a block having the first number of bits, and the second error correction code parity bits strings having the second number of bits; and generate the second encoded block.

3. The wireless communication apparatus according to claim 2, wherein, when retransmission for the second frame is requested among the encoded frames aggregated in the transmittal transmission packet data, the controlling circuitry is configured to generate the second error correction code parity bits strings having a third number bits, the third number is larger than the second number for the divided information bit string of the second frame for which retransmission is required; to add a part or all of the second error correction code parity bits strings to the divided information bit string; and generate the second encoded block.

4. The wireless communication apparatus according to claim 2, wherein the controlling circuitry is configured to perform block encoding using encoding of a same method for the frames.

5. The wireless communication apparatus according to claim 1, wherein the controlling circuitry is configured to combine a bit string of the block having the number of bits less than the first number of bits and the second error correction code parity bits strings having the second number of bits; and generate the second encoded block.

6. The wireless communication apparatus according to claim 5, wherein, when retransmission for the second frame is requested among the encoded frames aggregated in the transmittal transmission packet data, the controlling circuitry is configured to generate the second error correction code parity bits strings having a third number bits, the third number is larger than the second number for the divided information bit string of the second frame for which retransmission is required; to add a part or all of the second error correction code parity bits strings to the divided information bit string; and generate the second encoded block.

7. The wireless communication apparatus according to claim 5, wherein the controlling circuitry is configured to perform block encoding using encoding of a same method for the frames.

8. The wireless communication apparatus according to claim 1, wherein, when retransmission for the second frame is requested among the encoded frames aggregated in the transmittal transmission packet data, the controlling circuitry is configured to generate the second error correction code parity bits strings having a third number bits, the third number is larger than the second number for the divided information bit string of the second frame for which retransmission is required; to add a part or all of the second error correction code parity bits strings to the divided information bit string; and generate the second encoded block.

9. The wireless communication apparatus according to claim 1, wherein the controlling circuitry is configured to perform block encoding using encoding of a same method for the frames.

10. The wireless communication apparatus according to claim 1, further comprising:

receiver circuitry configured to receive the transmitted transmission packet data, wherein, when the transmission packet data is packet data including the second frame for which retransmission is requested, for the second encoded frame, the controlling circuitry is configured to perform likelihood synthesis on the second encoded block; and determine whether or not reception has succeeded.

11. A wireless communication method comprising:

dividing first data of a first frame for a transmission packet into first bit strings by a unit of a first number of bits, dividing second data of a second frame for the transmission packet into second bit strings by a unit of the first number of bits, adding at least one padding bit to one of the first bit strings according to a difference between (1) a number of bits of the one of the first bit strings and (2) the first number of bits, when the one of the first bit strings has a number of bits less than the first number of bits, adding at least one padding bit to one of the second bit strings according to a difference between (1) a number of bits of the one of the second bit strings and (2) the first number of bits, when the one of the second bit strings has a number of bits less than the first number of bits, adding first error correction code parity bits strings to the first bit string to generate first encoded blocks, wherein the first error correction code parity bits strings have a second number of bits, adding second error correction code parity bits strings to the second bit strings to generate second encoded blocks, wherein the second error correction code parity bits strings have the second number of bits, combining the first encoded blocks to generate a first encoded frame, wherein the first encoded frame has a length being an integral multiple of sum of the first number and the second number that matches a MAC frame boundary, combining the second encoded blocks to generate a second encoded frame, wherein the second encoded frame has a length being an integral multiple of the sum of the first number and the second number that matches the MAC frame boundary, and aggregating the first encoded frame and the second encoded frame following the first encode frame to generate the transmission packet data; and transmitting the transmission packet data.

* * * * *